(12) United States Patent
Wagner et al.

(10) Patent No.: US 12,258,223 B2
(45) Date of Patent: Mar. 25, 2025

(54) SYSTEMS AND METHODS FOR PROCESSING OBJECTS INCLUDING TRANSPORT VEHICLES

(71) Applicant: Berkshire Grey Operating Company, Inc, Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 0 days.

(21) Appl. No.: 18/643,833

(22) Filed: Apr. 23, 2024

(65) Prior Publication Data
US 2024/0343503 A1 Oct. 17, 2024

Related U.S. Application Data

(63) Continuation of application No. 17/950,704, filed on Sep. 22, 2022, now Pat. No. 12,077,393, which is a
(Continued)

(51) Int. Cl.
*B65G 47/90* (2006.01)
*B65G 1/04* (2006.01)
(Continued)

(52) U.S. Cl.
CPC .......... *B65G 47/90* (2013.01); *B65G 1/0485* (2013.01); *B65G 1/1378* (2013.01); *B65G 47/52* (2013.01); *B65G 67/02* (2013.01)

(58) Field of Classification Search
CPC ...... B65G 47/90; B65G 47/52; B65G 1/0485; B65G 1/1378; B65G 67/02
See application file for complete search history.

(56) References Cited

U.S. PATENT DOCUMENTS 3,595,407 A   7/1971   Mowatt-Larsen et al.
3,721,354 A   3/1973   Raynes et al.
(Continued)

FOREIGN PATENT DOCUMENTS

AU   2006204622 A1   3/2007
CA      2985166 A1  12/2016
(Continued)

OTHER PUBLICATIONS

Communication pursuant to Article 94(3) EPC issued by the European Patent Office in related European Patent Application No. 18716454.6 on Jan. 19, 2023, 13 pages.
(Continued)

*Primary Examiner* — Saul Rodriguez
*Assistant Examiner* — Ashley K Romano
(74) *Attorney, Agent, or Firm* — Gesmer Updegrove LLP

(57) ABSTRACT

A storage, retrieval and processing system for processing objects is disclosed. The storage, retrieval and processing system includes a storage bin system for receiving at a first
(Continued)

end thereof, a plurality of storage bins providing storage of a plurality of objects, a retrieval conveyance system at a second end of the storage bin system that is generally opposite the first end of the storage bin system, where the retrieval conveyance system is in communication with the plurality of storage bins, a programmable motion device in communication with the retrieval conveyance system for receiving the storage bins from the plurality of storage bins, where the programmable motion device includes an end effector for grasping and moving a selected object out of a selected storage bin, and a destination bin system for receiving the selected object from the end effector of the programmable motion device at first end of the destination bin system, and the destination bin system provides access to the plurality of destination bins at a second end thereof that is generally opposite the first end of the destination bin system.

29 Claims, 28 Drawing Sheets

Related U.S. Application Data continuation of application No. 17/094,792, filed on Nov. 10, 2020, now Pat. No. 11,492,212, which is a continuation of application No. 15/926,767, filed on Mar. 20, 2018, now Pat. No. 10,894,674.

(60) Provisional application No. 62/473,825, filed on Mar. 20, 2017.

(51) Int. Cl.
 *B65G 1/137* (2006.01)
 *B65G 47/52* (2006.01)
 *B65G 67/02* (2006.01)

(56) References Cited

U.S. PATENT DOCUMENTS

| | | | |
|---|---|---|---|
| 4,509,635 A | 4/1985 | Emsley |
| 4,542,808 A | 9/1985 | Lloyd, Jr. et al. |
| 4,678,390 A | 7/1987 | Bonneton et al. |
| 4,722,653 A | 2/1988 | Williams et al. |
| 4,846,335 A | 7/1989 | Hartlepp |
| 4,895,242 A | 1/1990 | Michel |
| 5,190,162 A | 3/1993 | Hartlepp |
| 5,271,703 A | 12/1993 | Lindqvist et al. |
| 5,419,457 A | 5/1995 | Ross et al. |
| 5,595,263 A | 1/1997 | Pignataro |
| 5,839,566 A | 11/1998 | Bonnet |
| 6,076,023 A | 6/2000 | Sato |
| 6,208,908 B1 | 3/2001 | Boyd et al. |
| 6,246,023 B1 | 6/2001 | Kugle |
| 6,323,452 B1 | 11/2001 | Bonnet |
| 6,377,867 B1 | 4/2002 | Bradley et al. |
| 6,390,756 B1 | 5/2002 | Isaacs et al. |
| 6,401,936 B1 | 6/2002 | Isaacs et al. |
| 6,505,093 B1 | 1/2003 | Thatcher et al. |
| 6,579,053 B1 | 6/2003 | Grams et al. |
| 6,685,031 B2 | 2/2004 | Takizawa |
| 6,688,459 B1 | 2/2004 | Bonham et al. |
| 6,698,990 B1 | 3/2004 | Dobner et al. |
| 6,762,382 B1 | 7/2004 | Danelski |
| 6,897,395 B2 | 5/2005 | Shiibashi et al. |
| 6,946,612 B2 | 9/2005 | Morikawa |
| 7,138,596 B2 | 11/2006 | Pippin et al. |
| 7,728,244 B2 | 6/2010 | DeLeo et al. |
| 7,861,844 B2 | 1/2011 | Hayduchok et al. |
| 7,925,376 B2 | 4/2011 | Lewis |
| 8,718,814 B1 | 5/2014 | Clark et al. |
| 8,776,694 B2 | 7/2014 | Rosenwinkel et al. |
| 8,798,784 B1 | 8/2014 | Clark et al. |
| 8,952,284 B1 | 2/2015 | Wong et al. |
| 8,972,045 B1 | 3/2015 | Mountz et al. |
| 9,020,632 B2 | 4/2015 | Naylor |
| 9,102,055 B1* | 8/2015 | Konolige ............... B25J 9/1612 |
| 9,102,336 B2 | 8/2015 | Rosenwinkel |
| 9,111,251 B1 | 8/2015 | Brazeau |
| 9,120,622 B1 | 9/2015 | Elazary et al. |
| 9,216,857 B1 | 12/2015 | Kalyan et al. |
| 9,272,845 B2 | 3/2016 | Honkanen et al. |
| 9,346,083 B2 | 5/2016 | Stone |
| 9,364,865 B2 | 6/2016 | Kim |
| 9,481,518 B2 | 11/2016 | Neiser |
| 9,492,923 B2 | 11/2016 | Wellman et al. |
| 9,520,012 B2 | 12/2016 | Stiernagle |
| 9,688,471 B2 | 6/2017 | Hellenbrand |
| 9,688,489 B1* | 6/2017 | Zevenbergen ........... B25J 11/00 |
| 9,694,977 B2 | 7/2017 | Aprea et al. |
| 9,751,693 B1 | 9/2017 | Battles et al. |
| 9,821,464 B2 | 11/2017 | Stiernagle et al. |
| 9,878,349 B2 | 1/2018 | Crest et al. |
| 9,926,138 B1 | 3/2018 | Brazeau et al. |
| 9,931,673 B2 | 4/2018 | Nice et al. |
| 9,962,743 B2 | 5/2018 | Bombaugh et al. |
| 9,975,148 B2 | 5/2018 | Zhu et al. |
| 10,007,827 B2 | 6/2018 | Wagner et al. |
| 10,029,865 B1 | 7/2018 | McCalib, Jr. et al. |
| 10,058,896 B2 | 8/2018 | Hicham et al. |
| 10,127,514 B2 | 11/2018 | Napoli |
| 10,137,566 B2 | 11/2018 | Bastian, II et al. |
| 10,438,034 B2 | 10/2019 | Wagner et al. |
| 10,618,745 B2* | 4/2020 | Wagner ............... B65G 47/493 |
| 10,865,053 B2 | 12/2020 | DeWitt et al. |
| 10,875,057 B2* | 12/2020 | Wagner .................. B07C 5/362 |
| 10,894,674 B2* | 1/2021 | Wagner .................. B65G 47/90 |
| 10,913,612 B2* | 2/2021 | Wagner ............... B65G 1/0492 |
| 11,319,166 B2 | 5/2022 | Diankov et al. |
| 11,492,212 B2 | 11/2022 | Wagner et al. |
| 2001/0038784 A1 | 11/2001 | Peltomaki |
| 2002/0026768 A1 | 3/2002 | Duncan et al. |
| 2002/0092801 A1 | 7/2002 | Dominguez |
| 2002/0179502 A1 | 12/2002 | Cerutti et al. |
| 2003/0038065 A1 | 2/2003 | Pippin et al. |
| 2005/0002772 A1 | 1/2005 | Stone |
| 2005/0149226 A1 | 7/2005 | Stevens et al. |
| 2005/0220600 A1 | 10/2005 | Baker et al. |
| 2006/0020366 A1* | 1/2006 | Bloom .................. G06Q 20/00 |
| | | 700/226 |
| 2007/0209976 A1 | 9/2007 | Worth et al. |
| 2008/0046116 A1 | 2/2008 | Khan et al. |
| 2008/0181753 A1 | 7/2008 | Bastian et al. |
| 2008/0269960 A1 | 10/2008 | Kostmann |
| 2009/0047178 A1 | 2/2009 | Chojnacki et al. |
| 2009/0074545 A1 | 3/2009 | Lert, Jr. et al. |
| 2010/0318216 A1 | 12/2010 | Faivre et al. |
| 2011/0144798 A1 | 6/2011 | Freudelsperger |
| 2011/0238207 A1 | 9/2011 | Bastian, II et al. |
| 2012/0118699 A1 | 5/2012 | Buchmann et al. |
| 2012/0177465 A1 | 7/2012 | Koholka |
| 2012/0219397 A1 | 8/2012 | Baker |
| 2012/0328397 A1 | 12/2012 | Yamashita |
| 2014/0086709 A1 | 3/2014 | Kasai |
| 2014/0086714 A1 | 3/2014 | Malik |
| 2014/0100999 A1 | 4/2014 | Mountz et al. |
| 2014/0214195 A1* | 7/2014 | Worsley ............... G05D 1/0287 |
| | | 700/217 |
| 2014/0244026 A1 | 8/2014 | Neiser |
| 2014/0277693 A1 | 9/2014 | Naylor |
| 2014/0291112 A1 | 10/2014 | Lyon et al. |
| 2015/0098775 A1 | 4/2015 | Razumov |
| 2015/0203297 A1 | 7/2015 | Manning et al. |
| 2016/0027093 A1 | 1/2016 | Crebier |
| 2016/0107848 A1 | 4/2016 | Baker |
| 2016/0244262 A1 | 8/2016 | O'Brien et al. |
| 2016/0325934 A1 | 11/2016 | Stiernagle et al. |
| 2016/0347555 A1 | 12/2016 | Yohe et al. |
| 2016/0355337 A1 | 12/2016 | Lert et al. |
| 2017/0043953 A1 | 2/2017 | Battles et al. |
| 2017/0087731 A1 | 3/2017 | Wagner et al. |
| 2017/0121113 A1 | 5/2017 | Wagner et al. |

(56) References Cited

U.S. PATENT DOCUMENTS

| | | |
|---|---|---|
| 2017/0121114 A1 | 5/2017 | Einav et al. |
| 2017/0129715 A1 | 5/2017 | Yohe et al. |
| 2017/0136632 A1 | 5/2017 | Wagner et al. |
| 2017/0157648 A1 | 6/2017 | Wagner et al. |
| 2017/0157649 A1 | 6/2017 | Wagner et al. |
| 2017/0173638 A1 | 6/2017 | Wagner et al. |
| 2017/0225330 A1 | 8/2017 | Wagner et al. |
| 2017/0233188 A1 | 8/2017 | Tai |
| 2017/0305668 A1 | 10/2017 | Bestic et al. |
| 2017/0312789 A1 | 11/2017 | Schroader |
| 2017/0320101 A1 | 11/2017 | Bombaugh et al. |
| 2017/0322561 A1 | 11/2017 | Stiernagle |
| 2017/0349385 A1 | 12/2017 | Moroni et al. |
| 2018/0085788 A1 | 3/2018 | Engel et al. |
| 2018/0127219 A1 | 5/2018 | Wagner et al. |
| 2018/0148272 A1 | 5/2018 | Wagner et al. |
| 2018/0186572 A1 | 7/2018 | Issing |
| 2018/0194574 A1 | 7/2018 | Wagner et al. |
| 2018/0265291 A1 | 9/2018 | Wagner et al. |
| 2018/0265298 A1 | 9/2018 | Wagner et al. |
| 2018/0265311 A1 | 9/2018 | Wagner et al. |
| 2018/0273295 A1 | 9/2018 | Wagner et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0282065 A1 | 10/2018 | Wagner et al. |
| 2018/0282066 A1 | 10/2018 | Wagner et al. |
| 2018/0305122 A1 | 10/2018 | Moulin et al. |
| 2018/0312336 A1 | 11/2018 | Wagner et al. |
| 2018/0327198 A1 | 11/2018 | Wagner et al. |
| 2018/0330134 A1 | 11/2018 | Wagner et al. |
| 2018/0333749 A1 | 11/2018 | Wagner et al. |
| 2019/0022702 A1 | 1/2019 | Vegh et al. |
| 2019/0047786 A1 | 2/2019 | Suzuki |
| 2019/0071260 A1 | 3/2019 | Laverdiere |
| 2019/0102712 A1 | 4/2019 | Duca |
| 2019/0329979 A1 | 10/2019 | Wicks et al. |
| 2019/0337723 A1 | 11/2019 | Wagner et al. |
| 2021/0061585 A1 | 3/2021 | Wagner et al. |
| 2023/0013172 A1 | 1/2023 | Wagner et al. |

FOREIGN PATENT DOCUMENTS

| | | |
|---|---|---|
| CA | 3056894 C | 10/2023 |
| CN | 1486912 A | 4/2004 |
| CN | 101428710 A | 5/2009 |
| CN | 101641270 A | 2/2010 |
| CN | 101998923 A | 3/2011 |
| CN | 102390701 A | 3/2012 |
| CN | 105246802 A | 1/2016 |
| CN | 105383843 A | 3/2016 |
| CN | 105692251 A | 6/2016 |
| CN | 106232503 A | 12/2016 |
| CN | 106395225 A | 2/2017 |
| CN | 108602630 A | 9/2018 |
| CN | 110431097 A | 11/2019 |
| CN | 114852726 A | 8/2022 |
| DE | 957200 C | 1/1957 |
| DE | 19510392 A1 | 9/1996 |
| DE | 102004001181 A1 | 8/2005 |
| DE | 102004013353 A1 | 10/2005 |
| DE | 102005032533 A1 | 1/2007 |
| DE | 102005061309 A1 | 7/2007 |
| DE | 102006057658 A1 | 6/2008 |
| DE | 102007023909 A1 | 11/2008 |
| DE | 102007038834 A1 | 2/2009 |
| DE | 102008039764 A1 | 5/2010 |
| DE | 102014111396 A1 | 2/2016 |
| EP | 0235488 T1 | 9/1987 |
| EP | 0767113 A2 | 4/1997 |
| EP | 1695927 A2 | 8/2006 |
| EP | 1995192 A2 | 11/2008 |
| EP | 2650237 A1 | 10/2013 |
| EP | 2937299 A1 | 10/2015 |
| EP | 3112295 A1 | 1/2017 |
| JP | S5442774 A | 4/1979 |
| JP | S54131278 A | 10/1979 |
| JP | S63310406 A | 12/1988 |
| JP | H0395001 A | 4/1991 |
| JP | H08157016 A | 6/1996 |
| JP | 2000238906 A | 9/2000 |
| JP | 2002028577 A | 1/2002 |
| JP | 2003150230 A | 5/2003 |
| JP | 2007182286 A | 7/2007 |
| JP | 2008037567 A | 2/2008 |
| JP | 2010202291 A | 9/2010 |
| JP | 2014141313 A | 8/2014 |
| NO | 20150758 A1 | 12/2016 |
| WO | 3095339 A1 | 11/2003 |
| WO | 2005118436 A1 | 12/2005 |
| WO | 2007007354 A1 | 1/2007 |
| WO | 2007009136 A1 | 1/2007 |
| WO | 2008089150 A2 | 7/2008 |
| WO | 2008091733 A2 | 7/2008 |
| WO | 2011038442 A2 | 4/2011 |
| WO | 2011128384 A1 | 10/2011 |
| WO | 2012127102 A1 | 9/2012 |
| WO | 2014111483 A1 | 7/2014 |
| WO | 2015118171 A1 | 8/2015 |
| WO | 2016023869 A2 | 2/2016 |
| WO | 2016198565 A1 | 12/2016 |
| WO | 2017036780 A1 | 3/2017 |
| WO | 2017044747 A1 | 3/2017 |
| WO | 2017064401 A1 | 4/2017 |
| WO | 2017081281 A1 | 5/2017 |
| WO | 2017148939 A1 | 9/2017 |
| WO | 2017150006 A1 | 9/2017 |
| WO | 2010017872 A1 | 2/2018 |
| WO | 2018175466 A1 | 9/2018 |
| WO | 2018176033 A1 | 9/2018 |

OTHER PUBLICATIONS

Communication pursuant to Rules 161(1) and 162 EPC issued by the European Patent Office in related European Patent Application No. 18716454.6 on Oct. 29, 2019, 3 pages.

Examiner's Report issued by the Innovation, Science and Economic Development in related Canadian Patent Application No. 3,056,894 on Nov. 27, 2020, 3 pages.

Examiner's Report issued by the Innovation, Science and Economic Development in related Canadian Patent Application No. 3,056,894 on Sep. 15, 2021, 3 pages.

Examiner's Report issued by the Innovation, Science and Economic Development (Canadian Intellectual Property Office) in related Canadian Patent Application No. 3,056,894 on Apr. 27, 2022, 3 pages.

First Office Action, and its English translation, issued by the China National Intellectual Property Administration issued in related Chinese Patent Application No. 201880019579.2 on Aug. 31, 2020, 17 pages.

International Preliminary Report on Patentability issued by the International Bureau of WIPO in related International Application No. PCT/US2018/023396 on Sep. 24, 2019, 10 pages.

International Search Report & Written Opinion issued by the International Searching Authority in related International Application No. PCT/US2018/023396 on Jun. 20, 2018, 16 pages.

Non-Final Office Action issued by the U.S. Patent and Trademark Office in related U.S. Appl. No. 15/926,767 on Mar. 17, 2020, 10 pages.

Non-Final Office Action issued by the U.S. Patent and Trademark Office in related U.S. Appl. No. 17/950,704 on Oct. 2, 2023, 7 pages.

Notice on Second Office Action and Second Office Action, along with its English translation, issued by the China National Intellectual Property Administration in related Chinese Patent Application No. 201880019579.2 on Apr. 15, 2021, 13 pages.

Notice on the First Office Action, along with its English translation, issued by the China National Intellectual Property Administration in related Chinese Patent Application No. 202210310523.6 on Mar. 30, 2023, 21 pages.

(56) References Cited

OTHER PUBLICATIONS

Notice on Third Office Action and Third Office Action, along with its English translation, issued by the China National Intellectual Property Administration in related Chinese Patent Application No. 201880019579.2 on Sep. 16, 2021, 7 pages.

\* cited by examiner

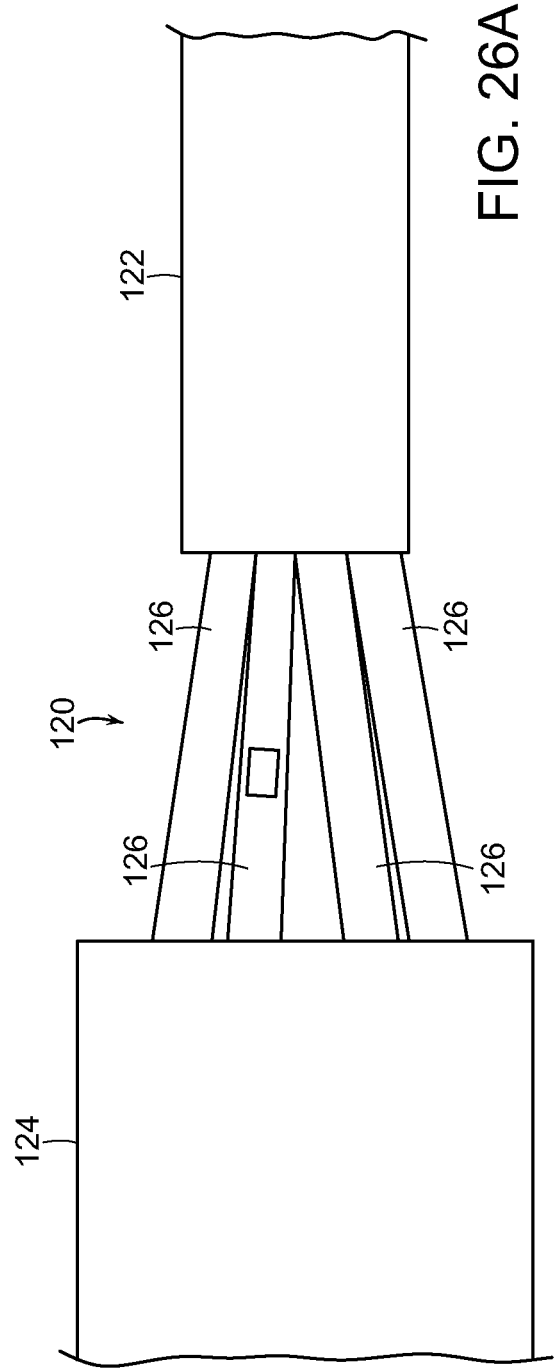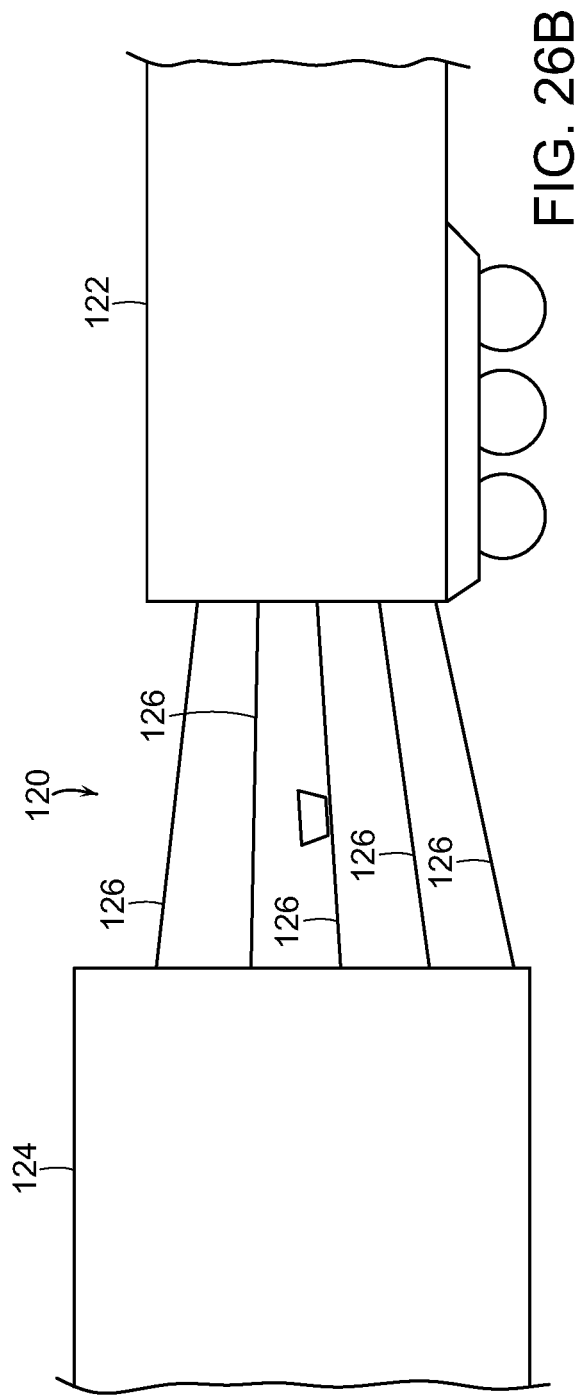

SYSTEMS AND METHODS FOR PROCESSING OBJECTS INCLUDING TRANSPORT VEHICLES

PRIORITY

The present application is a continuation of U.S. patent application Ser. No. 17/950,704, filed Sep. 22, 2022, which is a continuation of U.S. patent application Ser. No. 17/094,792, filed Nov. 10, 2020, now U.S. Pat. No. 11,492,212, issued Nov. 8, 2022, which is a continuation of U.S. patent application Ser. No. 15/926,767, filed Mar. 20, 2018, now U.S. Pat. No. 10,894,674, issued Jan. 19, 2021, which claims priority to U.S. Provisional Patent Application Ser. No. 62/473,825 filed Mar. 20, 2017, the disclosures of which are hereby incorporated by reference in their entireties.

BACKGROUND

The invention generally relates to storage and retrieval systems, and relates in particular to automated storage and retrieval systems that are used with systems for processing objects.

Automated storage and retrieval systems (AS/RS) generally include computer-controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects. There is further a need for a more efficient system for processing and transporting processed objects.

SUMMARY

In accordance with an embodiment, the invention provides a storage, retrieval and processing system for processing objects. The storage, retrieval and processing system includes a storage bin system for receiving at a first end thereof, a plurality of storage bins providing storage of a plurality of objects, a retrieval conveyance system at a second end of the storage bin system that is generally opposite the first end of the storage bin system, where the retrieval conveyance system is in communication with the plurality of storage bins, a programmable motion device in communication with the retrieval conveyance system for receiving the storage bins from the plurality of storage bins, where the programmable motion device includes an end effector for grasping and moving a selected object out of a selected storage bin, and a destination bin system for receiving the selected object from the end effector of the programmable motion device at first end of the destination bin system, and the destination bin system provides access to the plurality of destination bins at a second end thereof that is generally opposite the first end of the destination bin system.

In accordance with another embodiment, the invention provides a storage, retrieval and processing system for processing objects. The storage, retrieval and processing system includes a storage bin system for receiving from a vehicle at a first end of the storage bin system, a plurality of storage bins providing storage of a plurality of objects, a retrieval conveyance system at a second end of the storage bin system that is generally opposite the first end of the storage bin system, said retrieval conveyance system being in communication with the plurality of storage bins, a programmable motion device in communication with the retrieval conveyance system for receiving the storage bins from the plurality of storage bins, said programmable motion device moving a selected object out of a selected storage bin, and a destination bin system for receiving the selected object from the end effector of the programmable motion device at first end of the destination bin system, and where the destination bin system provides access to the plurality of destination bins at a second end thereof for another vehicle that is generally opposite the first end of the destination bin system.

In accordance with a further embodiment, the invention provides a method of providing storage, retrieval and processing of objects. The method includes the steps of receiving at a first end of a storage bins system, a plurality of storage bins providing storage of a plurality of objects, retrieving a selected storage bin from the storage bin system, grasping and moving a selected object out of the selected storage bin and toward a first end of a destination bin system, and moving the selected object to a designated destination bin of a plurality of destination bins provided in the destination bin system, said destination bin system providing access to the plurality of destination bins at a second end thereof that is generally opposite the first end of the destination bin system.

BRIEF DESCRIPTION OF THE DRAWINGS

The following description may be further understood with reference to the accompanying drawings in which:

FIGS. 26A and 26B show illustrative diagrammatic top and side views of adapter systems that may be employed in the systems of FIGS. 24 and 25.

The drawings are for illustrative purposed only.

DETAILED DESCRIPTION

In accordance with an embodiment, the invention provides a storage, retrieval and processing system for processing objects that includes a storage bin system, a retrieval system, a programmable motion device, and a destination bin system. The storage bin system is for receiving at a first end thereof, a plurality of storage bins providing storage of a plurality of objects. The retrieval conveyance system is at a second end of the storage bin system that is generally opposite the first end of the storage bin system, and the retrieval conveyance system is in communication with the plurality of storage bins. The programmable motion device is in communication with the retrieval conveyance system for receiving the storage bins from the plurality of storage bins, and the programmable motion device includes an end effector for grasping and moving a selected object out of a selected storage bin. The destination bin system is for receiving the selected object from the end effector of the programmable motion device at first end of the destination bin system, and the destination bin system provides access to the plurality of destination bins at a second end thereof that is generally opposite the first end of the destination bin system.

Figure 1:
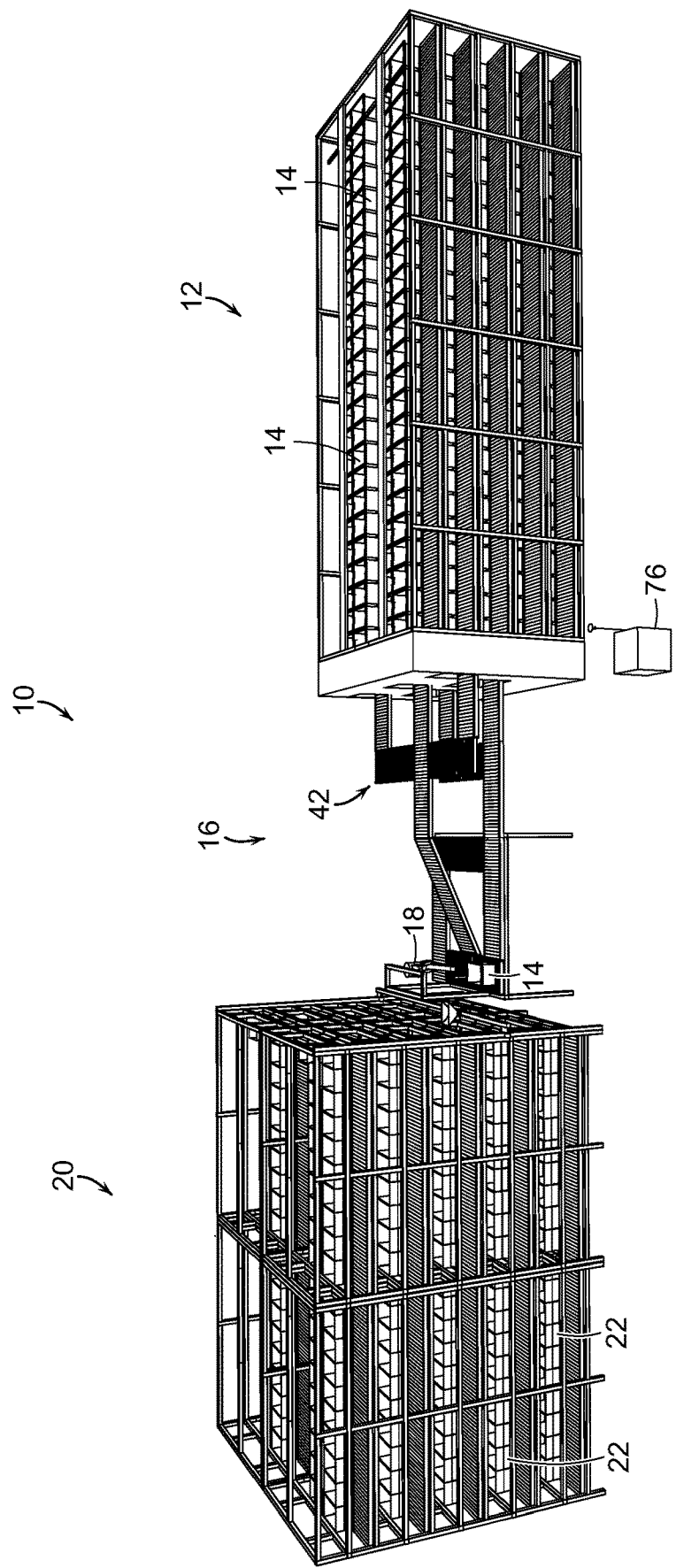
FIG. 1 shows an illustrative diagrammatic view of a storage, retrieval and processing system in accordance with an embodiment of the present invention.

In an embodiment, the invention provides a system by which vehicles such as trucks, may back up to a bin unloading system, unload the bins into a storage section, process the bins using the automated storage, retrieval and processing system of the invention, and load processed bins automatically into vehicles such as trucks for transport. With reference to FIG. 1, an automated storage, retrieval and processing system 10 in accordance with an embodiment of the present invention includes a storage system 12 at which a plurality of storage bins 14 are provided from a vehicle (as discussed further below), a processing system 16 that includes a programmable motion device 18, and a destination system 20 that includes destination bins 22 that may be loaded onto a vehicle (as discussed further below). Generally, storage bins 14 are unloaded from vehicles, and are selectively provided to and from the processing system 16, where objects are moved from a selected storage bin and placed or dropped by the programmable motion device 18 into a primary carriage system 24 (that moves vertically and horizontally as discussed further below). From the primary carriage system 24, objects are delivered to one of a plurality of secondary carriage systems (that run horizontally along the length of the destination system 20), which bring objects to destination bins 22 of the destination system 20, and from where the destination bins may be loaded onto vehicles.

Figure 2:
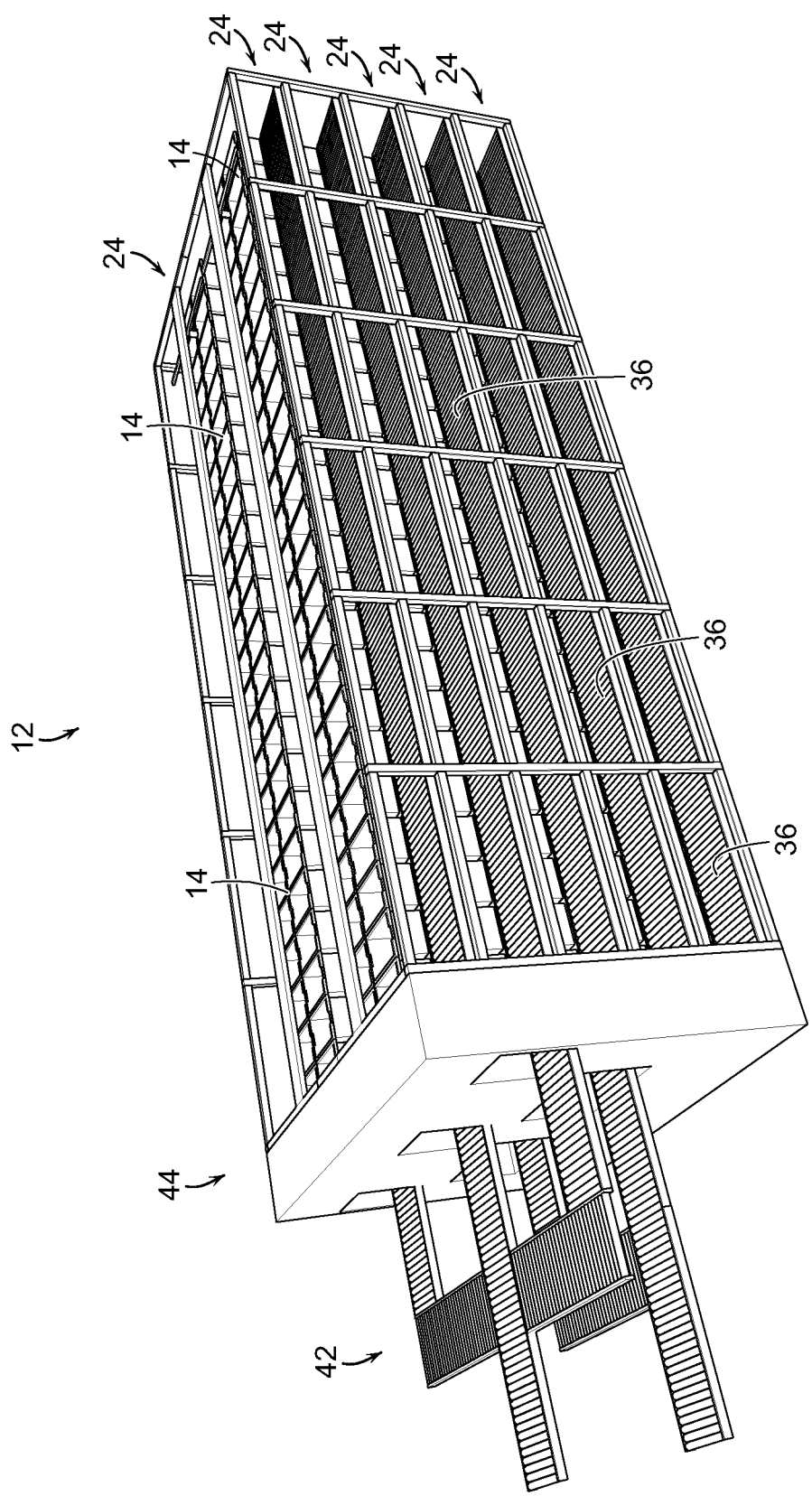
FIG. 2 shows an illustrative diagrammatic view of a storage bin system of FIG. 1.
Figure 3:
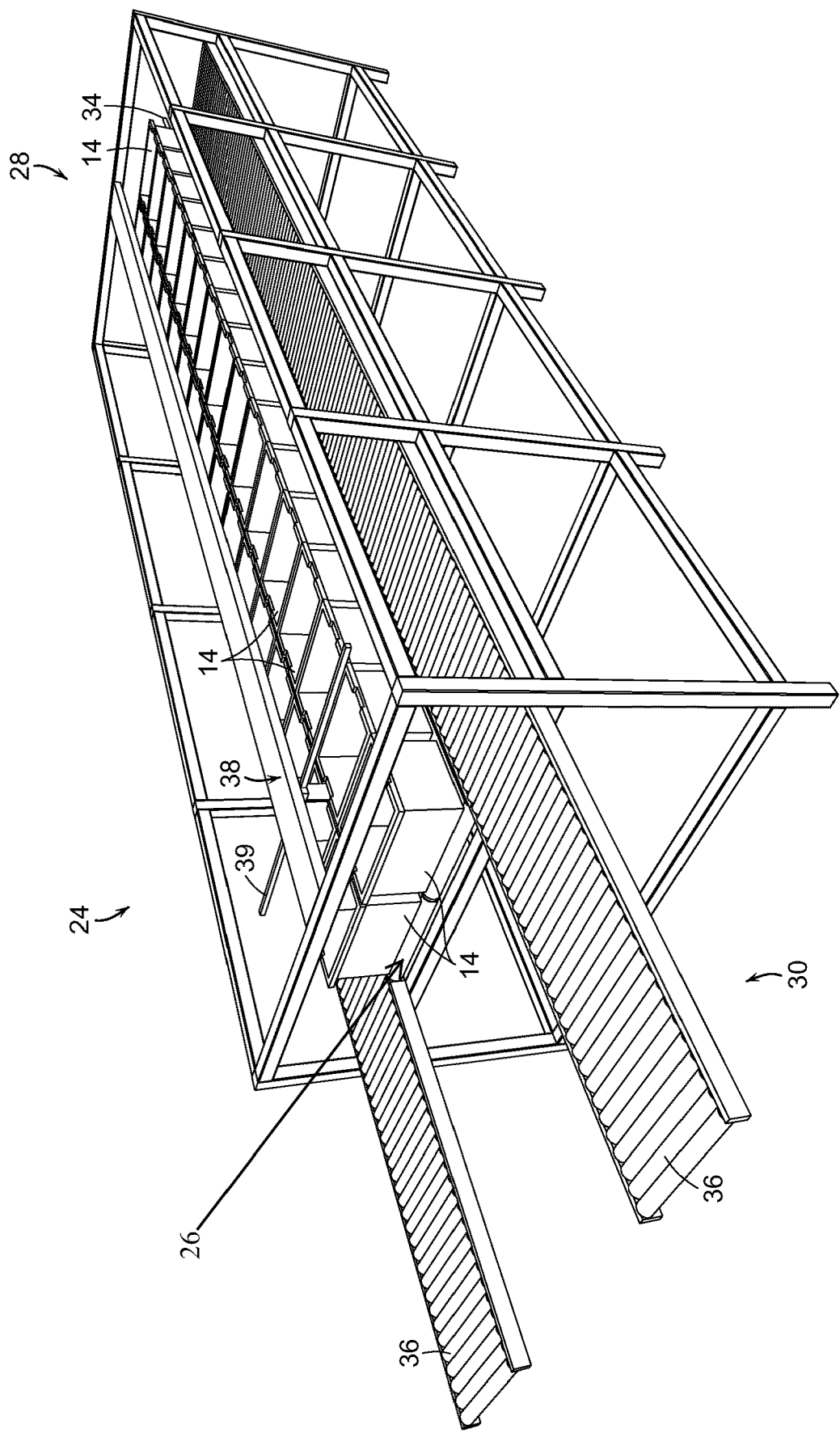
FIG. 3 shows an illustrative diagrammatic view of a portion of the storage bin system of FIG. 2.

In particular, and with reference to FIG. 2, the storage system 12 includes a plurality of storage sections 24, each of which includes a plurality of storage bins 14 on a pair of infeed conveyors 26. Each infeed conveyor 26 is biased (e.g., by gravity) to cause each of the storage bins 14 to be urged away from an input end 28 and toward a processing end 30 of the storage section 24 as shown in FIG. 3. Further, each of the storage bins 14 includes unique identification indicia (e.g., a barcode) that is detected by storage perception devices 34 as the bins are delivered onto the infeed conveyors 26. The storage system 12 knows the size of each storage bin 14, and therefore knows where each bin is located as well as the identity (and therefore the contents) of each storage bin.

Figure 4A:
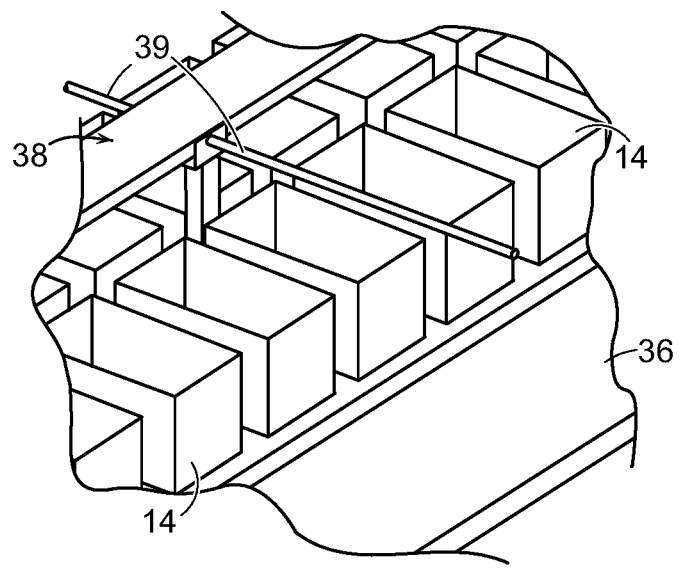
FIGS. 4A and 4B show illustrative diagrammatic views of embodiments of a bin displacement system for use in a retrieval conveyance system of the invention.
Figure 4B:
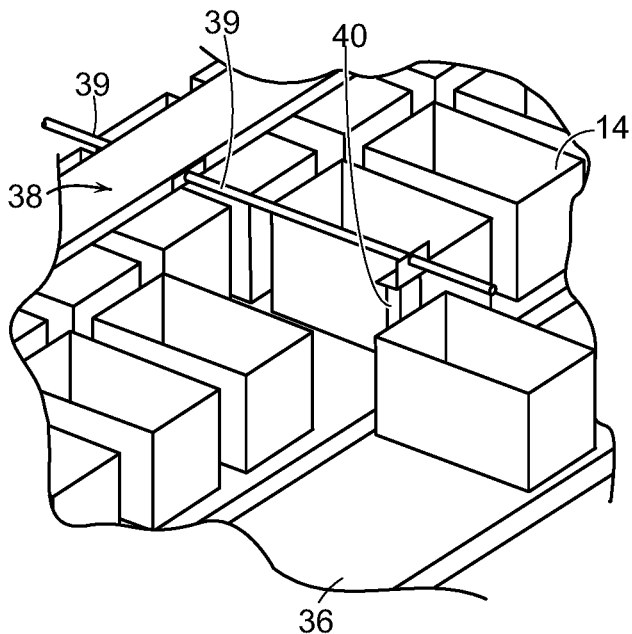

Each storage section also includes a pair of retrieval conveyors 36 that are provided adjacent to the storage bins, and as further shown with reference to FIGS. 4A and 4B, when a storage bin 14 is selected for retrieval, a bin removal mechanism 39 travels along a guide rail 38 between the bins 14, and stops adjacent to the selected storage bin as shown in FIG. 4A. With reference to FIG. 4B, the system will then move an urging mechanism 40 of the mechanism 39 to push the selected bin onto a retrieval conveyor 36. The conveyor 36 (as well as the other conveyors in the processing system) may be motion controlled so that both the speed and the direction of the conveyor (e.g., rollers or belt) may be controlled. In certain embodiments, certain of the conveyors (e.g., conveyors leading from the storage station 12 to the processing station 16) may be gravity biased to cause any storage bin on any conveyor system to be delivered to the processing section 16 near the programmable motion device 18.

The bins 14 may be provided as boxes, totes, containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 5:
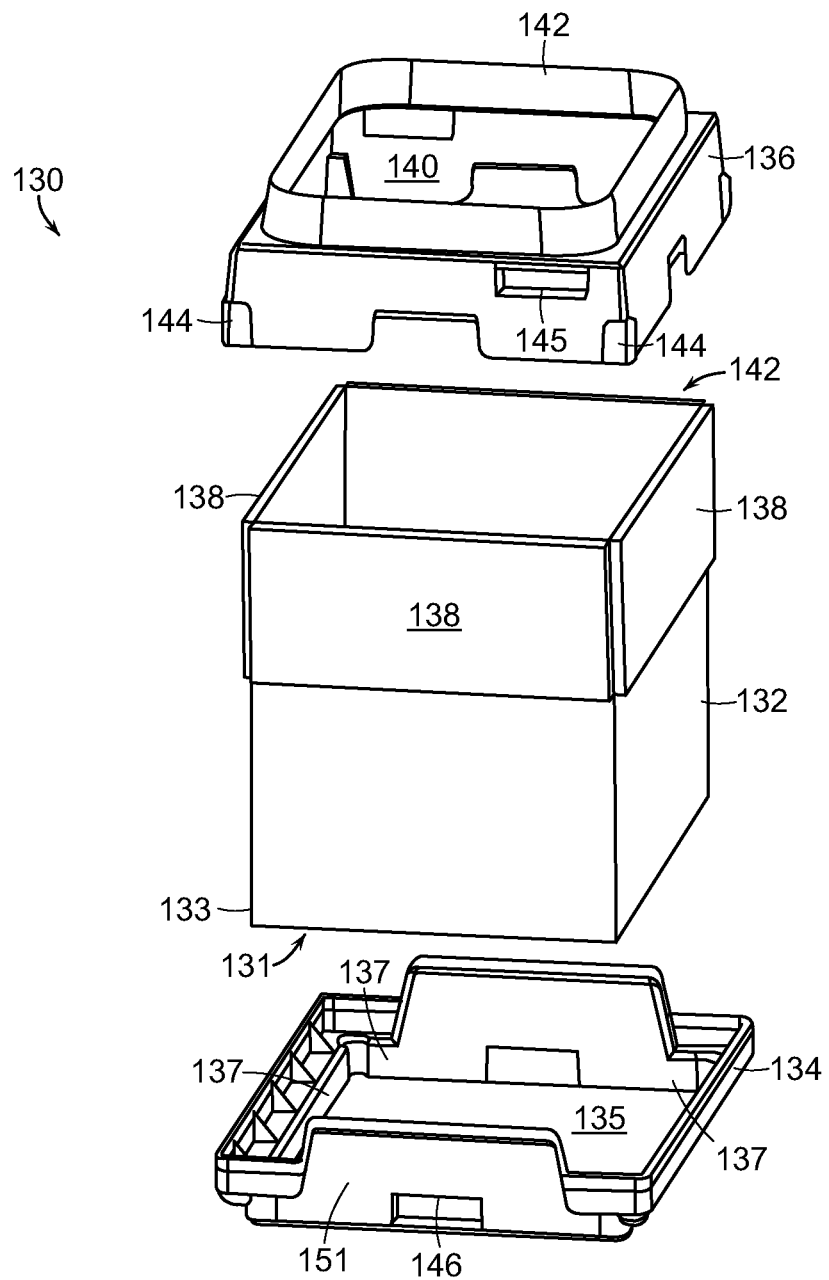
FIG. 5 shows an illustrative diagrammatic exploded view of a box assembly for use as a storage bin or destination bin in accordance with various embodiments of the present invention.

For example, FIG. 5 shows an exploded view of a box tray assembly 130. As shown, the box 132 (e.g., a standard shipping sized cardboard box) may include bottom 131 and side edges 133 that are received by a top surface 135 and inner sides 137 of a box tray 134. The box tray 134 may include a recessed (protected) area in which a label or other identifying indicia 146 may be provided, as well as a wide and smooth contact surface 151 that may be engaged by an urging or removal mechanism as discussed below.

As also shown in FIG. 5, the box 132 may include top flaps 138 that, when opened as shown, are held open by inner surfaces 140 of the box cover 136. The box cover 136 may also include a recessed (protected) area in which a label or other identifying indicia 145 may be provided. The box cover 136 also provides a defined rim opening 142, as well as corner elements 144 that may assist in providing structural integrity of the assembly, and may assist in stacking un-used covers on one another. Un-used box trays may also be stacked on each other.

Figure 6:
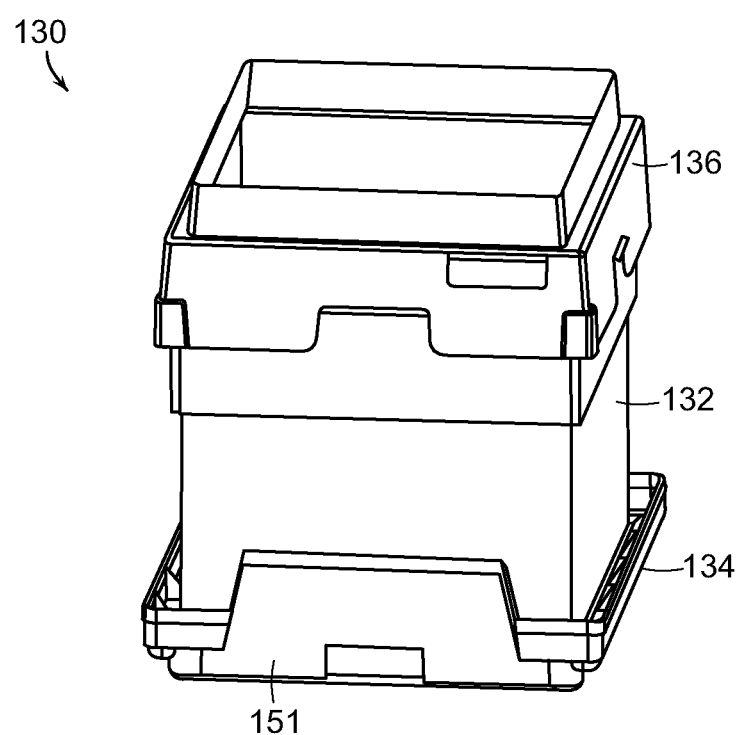
FIG. 6 shows an illustrative diagrammatic view of the assembled box tray assembly of FIG. 5.

The box 132 is thus maintained securely within the box tray 134, and the box cover 136 provides that the flaps 138 remain down along the outside of the box permitting the interior of the box to be accessible through the opening 142 in the box cover 136. FIG. 6 shows a width side view of the box tray assembly 130 with the box 132 securely seated within the box tray 134, and the box cover holding open the flaps 138 of the box 132. The box tray assemblies may be used as any or both of the storage bins and destination bins in various embodiments of the present invention.

Figure 7A:
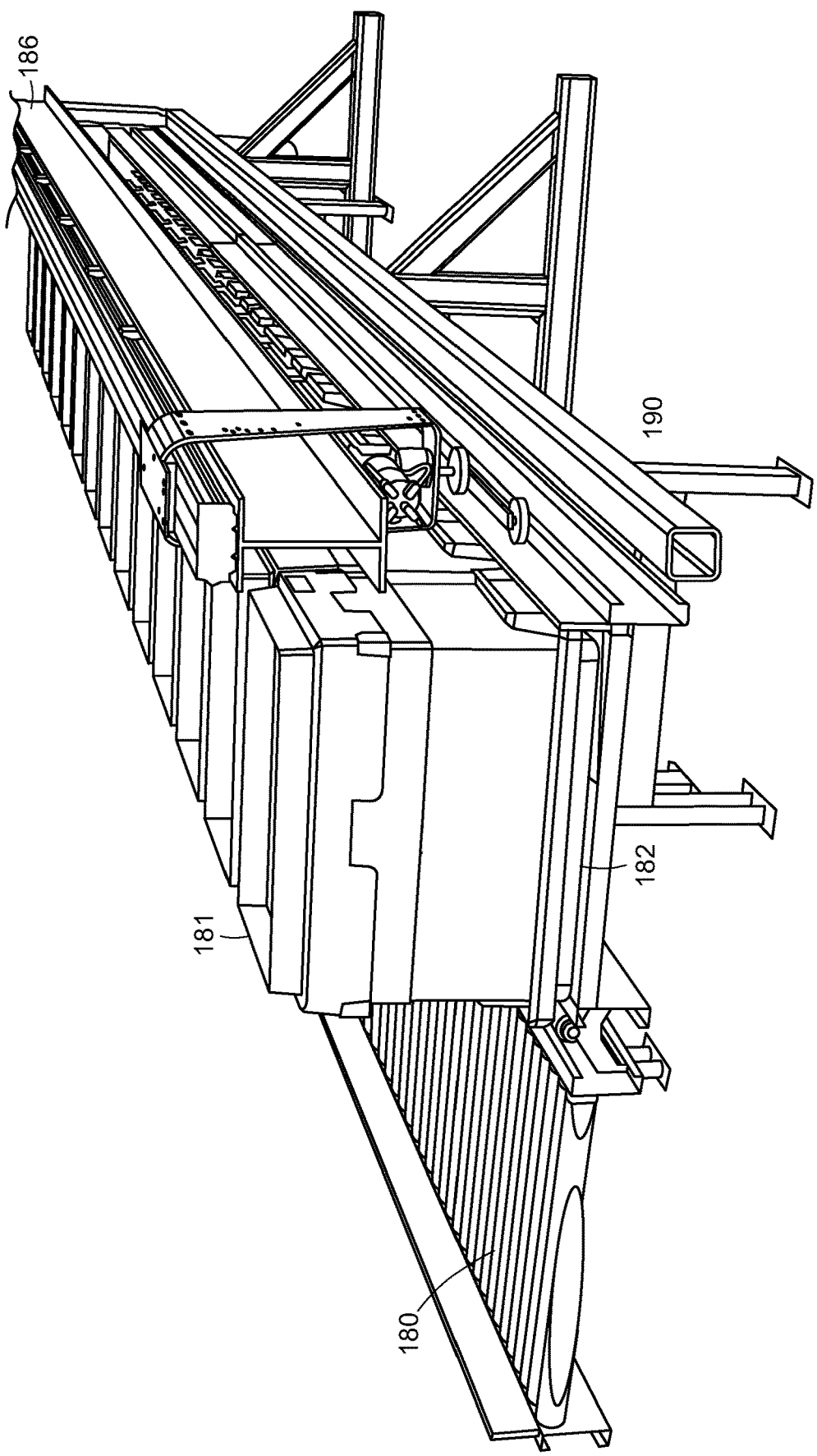
FIG. 7A-7D show illustrative diagrammatic views of a further embodiment of a bin displacement system for use in further embodiments of the invention.
Figure 7B:
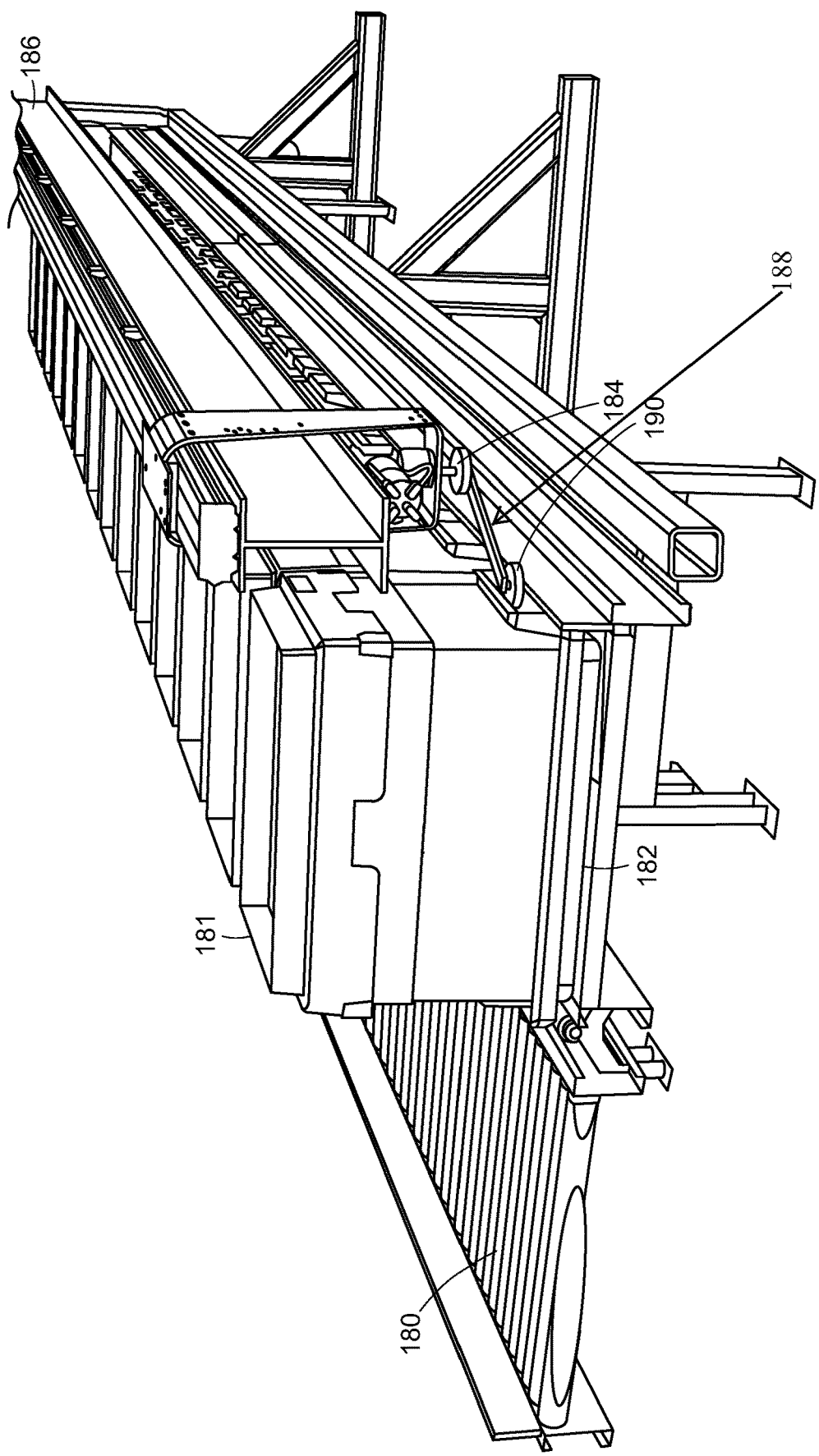
Figure 7C:
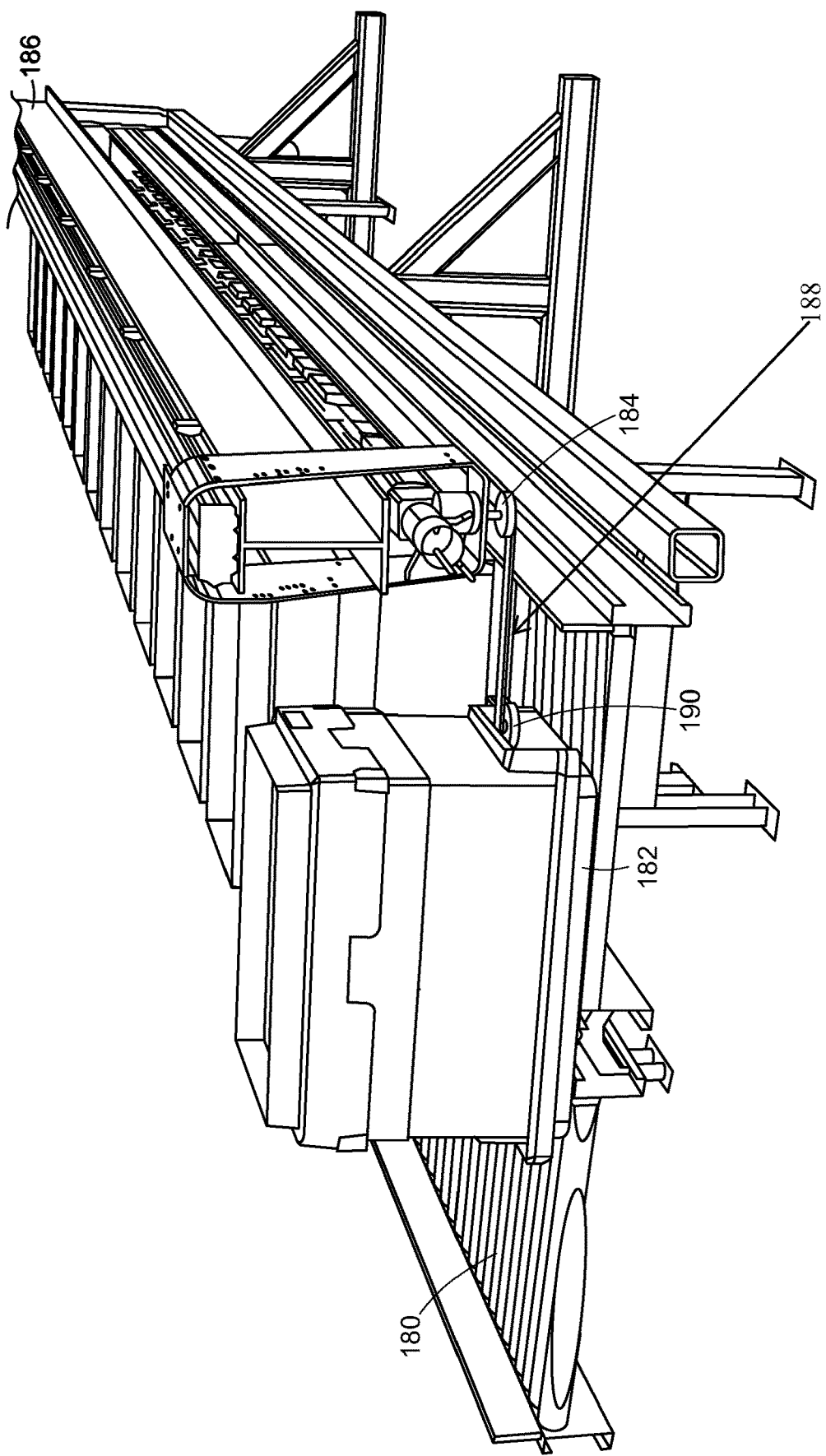
Figure 7D:
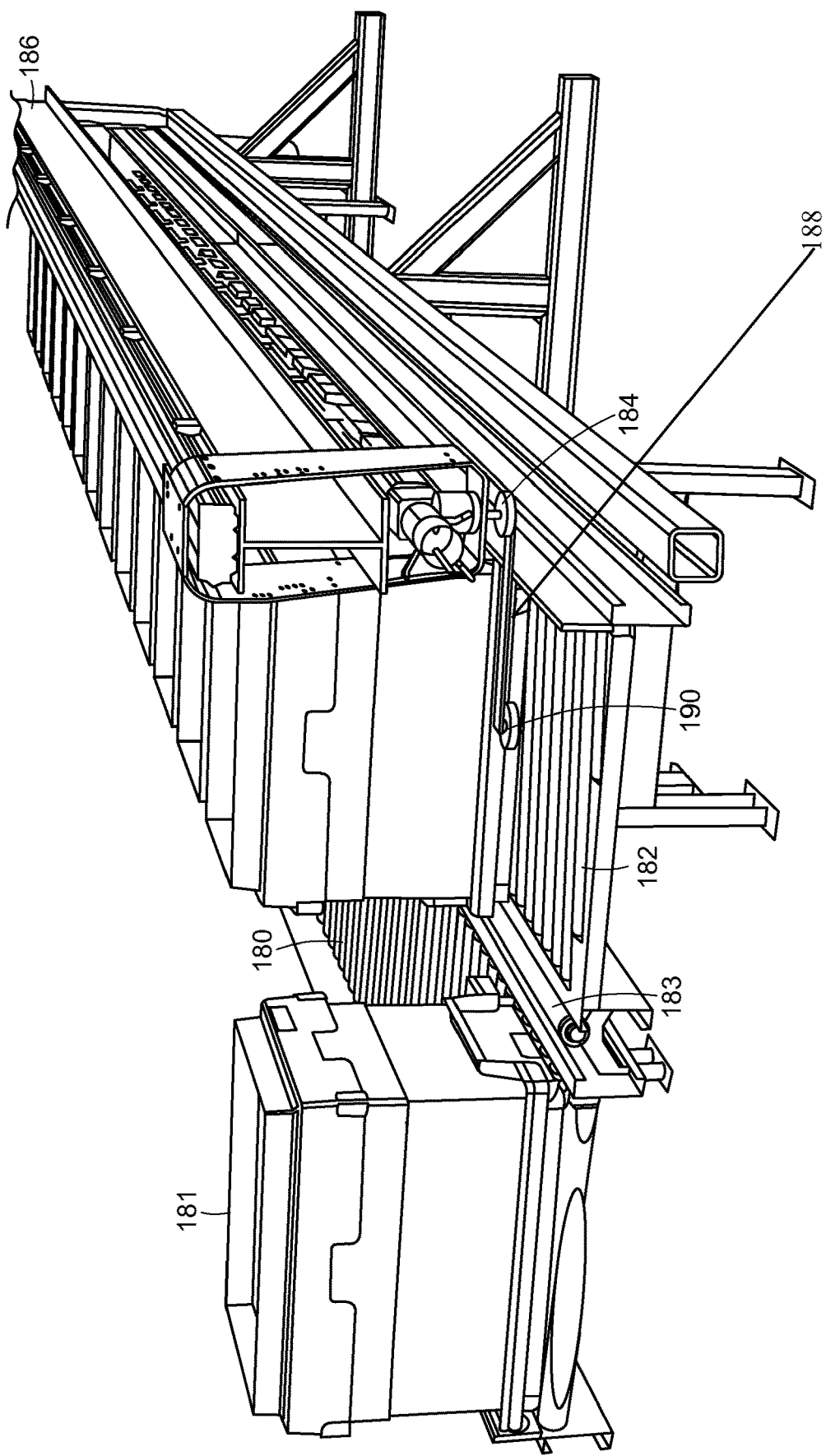

With reference to FIGS. 7A-7D, a box kicker 184 in accordance with an embodiment of the present invention may be suspended by and travel along a track 186, and may include a rotatable arm 188 and a roller wheel 190 at the end of the arm 188. With reference to FIGS. 7B-7D, when the roller wheel 190 contacts the kicker plate 151 (shown in FIG. 5) of a box tray assembly 120, the arm 188 continues to rotate, urging the box tray assembly 180 from a first conveyor 182 to a second conveyor 180. Again, the roller wheel 190 is designed to contact the kicker plate 151 of a box tray assembly 181 to push the box tray assembly 181 onto the conveyor 180. Such a system may be used to provide that boxes that are empty or finished being unloaded may be removed (e.g., from conveyor 182), or that boxes that are full or finished being loaded may be removed (e.g., from conveyor 182). The conveyors 180, 182 may also be coplanar, and the system may further include transition roller 183 to facilitate movement of the box tray assembly 181, e.g., by being activated to pull the box tray over to the conveyor 180.

Figure 8:
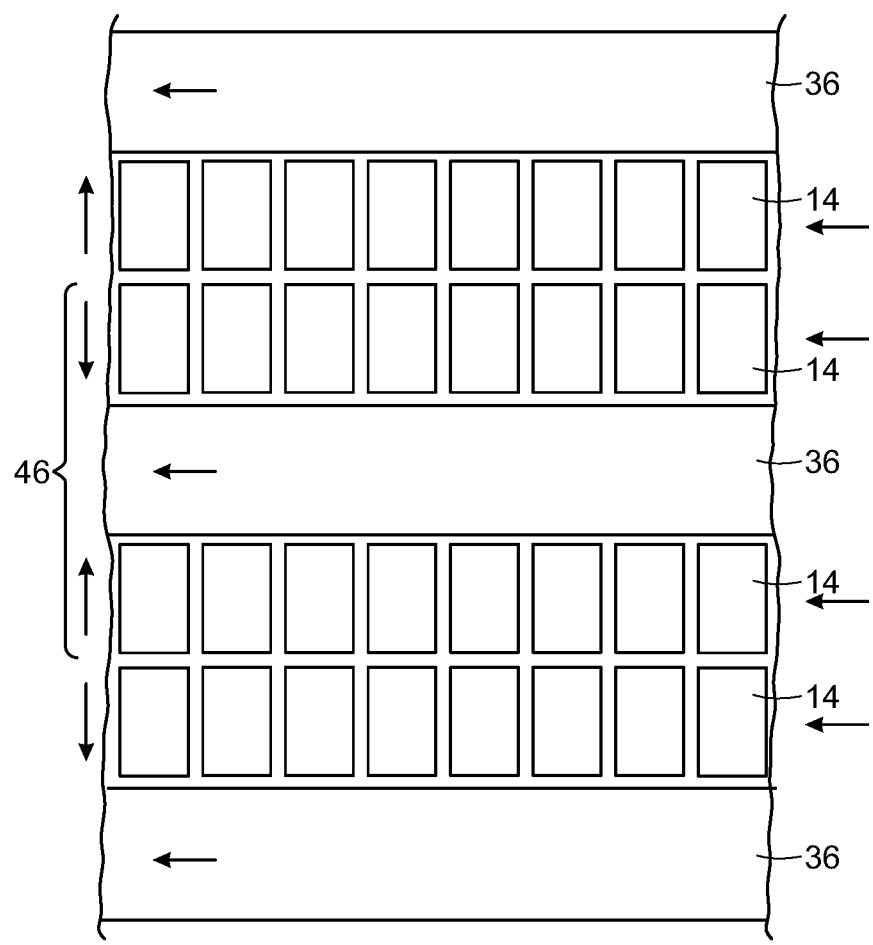
FIG. 8 shows an illustrative diagrammatic view of a storage bin processing along a portion of a single level in a system in accordance with an embodiment of the invention.
Figure 9:
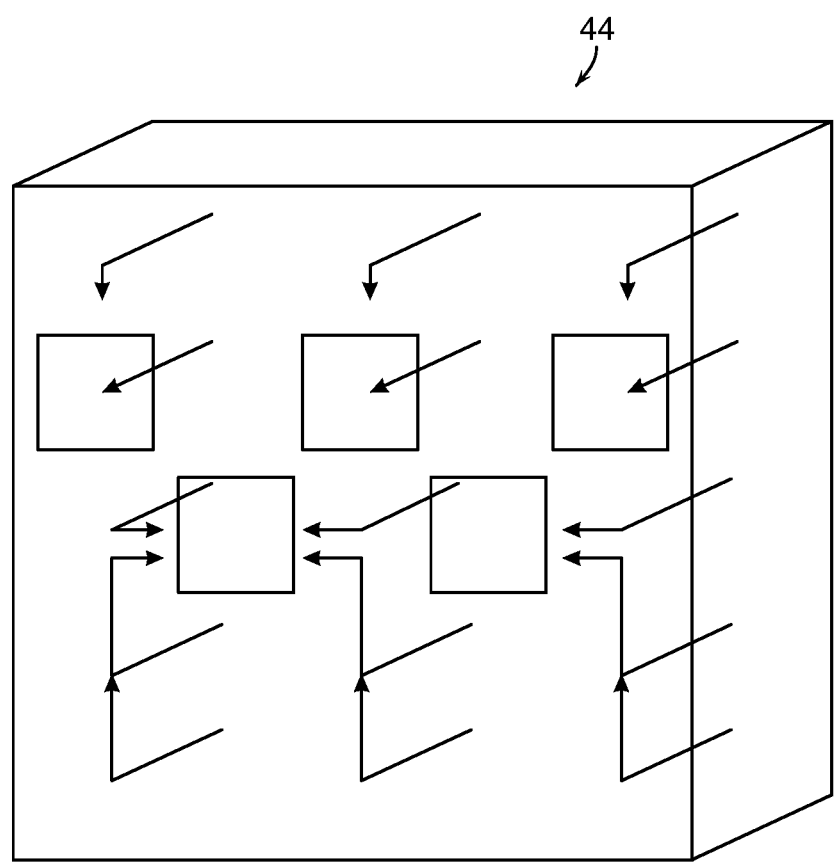
FIG. 9 shows an illustrative diagrammatic view of a storage bin processing along multiple levels in a system in accordance with an embodiment of the invention.

The conveyors 36 may each serve more than one row of storage bins. FIG. 8, for example, shows three retrieval conveyors 36 that serve two sets of two rows of storage bins. As shown at 46, each of the storage bins in two of the rows may feed into one retrieval conveyor 36. If, for example, the storage system serves four rows of storage bins by five levels of such rows, the system may receive the four rows in an arrangement as shown in FIG. 8, and may provide output bin as shown in FIG. 9. In particular, FIG. 9 shows at 44 a directional mapping of how storage bins may be directed from the retrieval conveyors 36 to retrieval output conveyors 48 via conveyors and bin lifters.

With reference again to FIG. 1, the retrieval output conveyors 42 come together into a pair of processing conveyors 48 that lead to the programmable motion device 18, one of which may provide an input to the processing area of the device 18, while the other may provide an output to return a storage bin to the storage system. In addition to the programmable motion device 18, the processing system includes a processing perception unit 50 that is directed to look down into a selected storage unit. Due to the presence of a bin perception unit 52 that detects the identifying indicia of a bin being processed, the system confirms the identity of the bin (and therefore the objects) being processed. Again, the storage system requested that the selected storage bin be retrieved and provided to the processing system, so the perception unit(s) 52 confirm that the correct bin is ready to be processed. The perception unit 50 is directed to look down into the bin being processed, and the field of view, for example, may appear generally as shown at 54 in FIG. 11.

Figure 10:
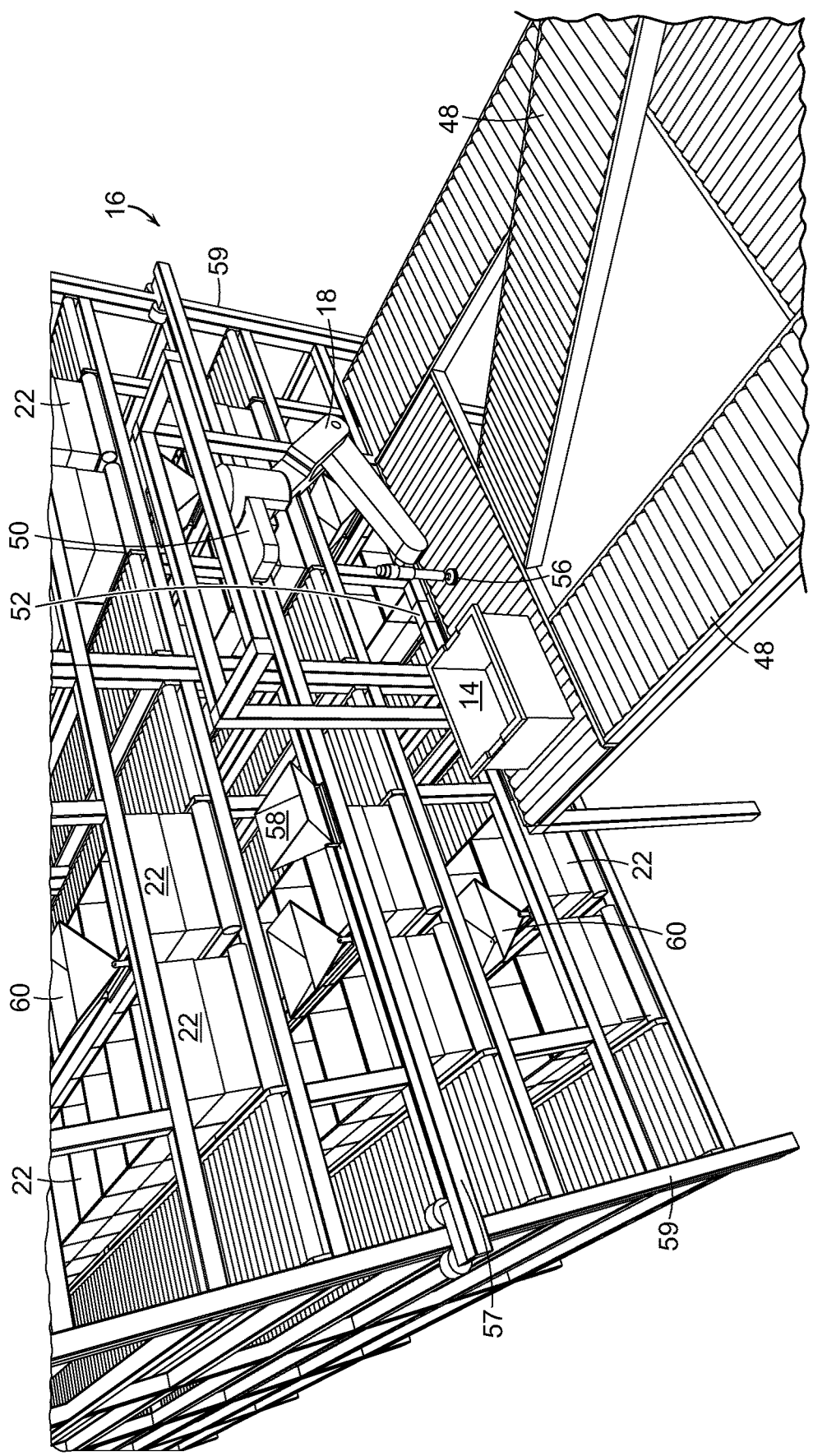
FIG. 10 shows an illustrative diagrammatic view of a portion of a processing station in a system in accordance with an embodiment of the invention.

An end effector 56 of the programmable motion device 18 grasps an object in bin 14, and moves to deliver the object to a primary carriage 58 as shown in FIG. 10. The primary carriage 58 then moves along an X-Y vertical frame provided by a horizontal section 57 and two vertical sections 59, to move the object to one of plurality of shuttle carriages 60 (as further shown in FIGS. 15-21). The shuttle carriages facilitate moving the object to a desired destination bin 22 by placing or dropping the object into a carriage, that then shuttles the object to the selected destination bin 22.

The storage bin may then be returned to the plurality of storage bins at the storage station, and may be returned anywhere among the bins as long as the system knows where the bin has been returned, and knows how each of the bins may have been moved when the selected storage bin was transferred to the conveyor 36. Again, the storage bins, for example, may be biased (e.g., by gravity) to stack against one of the ends of each row of bins.

Figure 11:
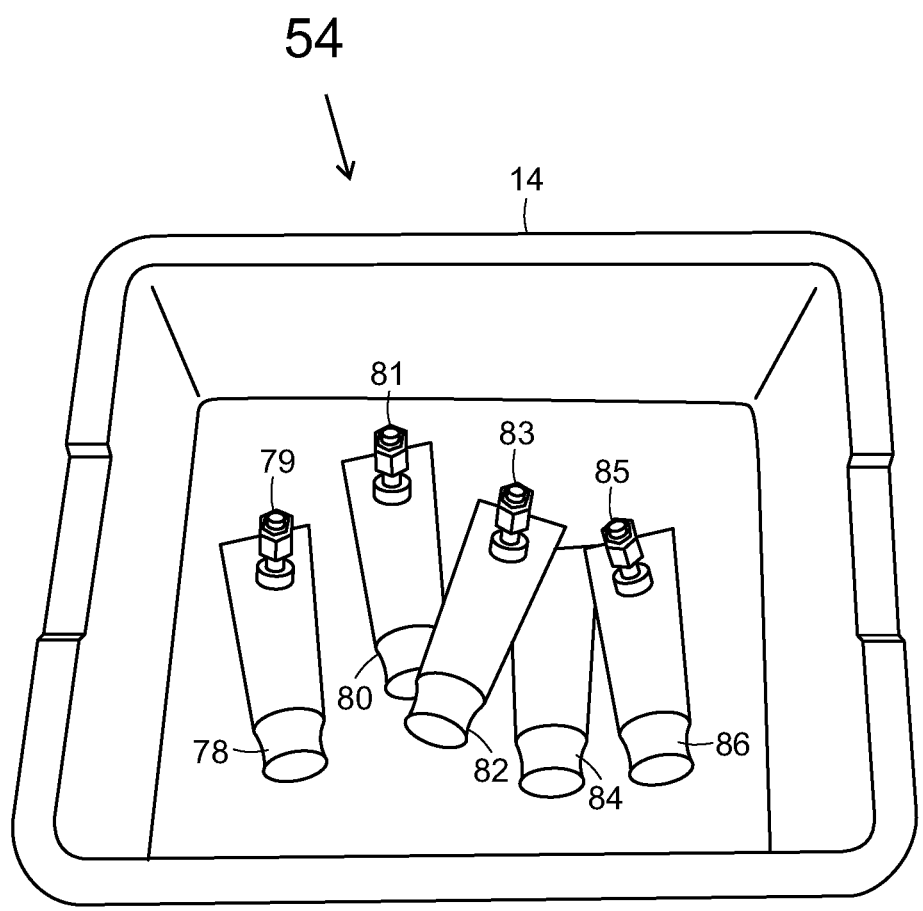
FIG. 11 shows an illustrative diagrammatic view from the perception system of FIG. 10, showing a view of objects within a bin of objects to be processed.

FIG. 11 shows an image view 54 of the bin 14 from the perception unit 50. The image view shows the bin 14 (e.g., on a conveyor), and the bin 14 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 11. Grasp locations may be considered good, for example, if they are close to the center of mass of the object to provide greater stability during grasp and transport, and/or if they avoid places on an object such as caps, seams, etc. where a good vacuum seal might not be available.

If an object cannot be fully perceived by the detection system, the perception system considers the object to be two different objects, and may propose more than one candidate grasp of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 12A:
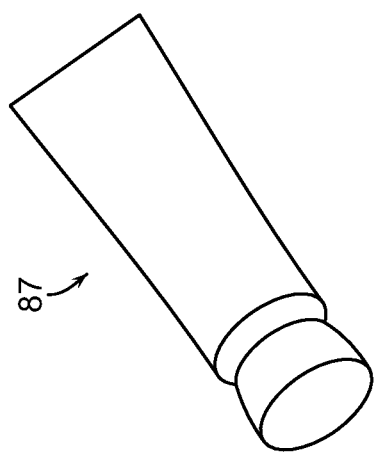
FIGS. 12A and 12B show illustrative diagrammatic views of a grasp selection process in a storage, retrieval and processing system of an embodiment of the present invention.
Figure 12B:
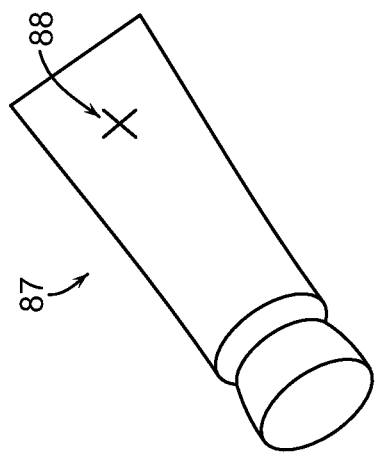

As shown in FIGS. 12A and 12B, the perception system may also identify portions of an object that are the most flat in the generation of good grasp location information. In particular, if an object includes a tubular end and a flat end such as object 87, the system would identify the more flat end as shown at 88 in FIG. 12B. Additionally, the system may select the area of an object where a UPC code appears, as such codes are often printed on a relatively flat portion of the object to facilitate scanning of the barcode.

Figure 14A:
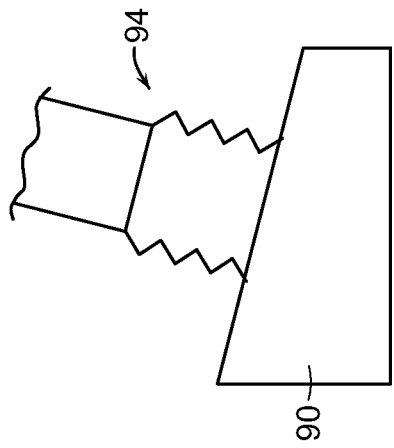
FIGS. 14A and 14B show illustrative diagrammatic views of a grasp execution process in a storage, retrieval and processing system of an embodiment of the present invention.
Figure 14B:
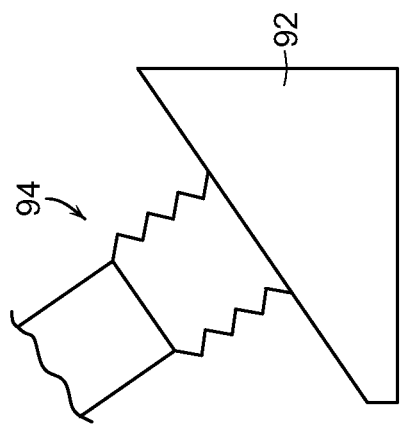
Figure 13A:
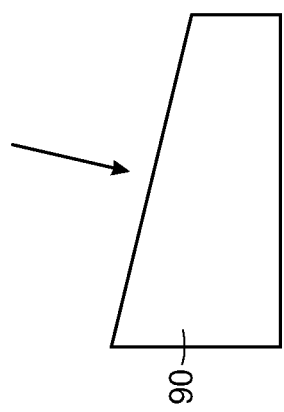
FIGS. 13A and 13B show illustrative diagrammatic views of a grasp planning process in a storage, retrieval and processing system of an embodiment of the present invention.
Figure 13B:
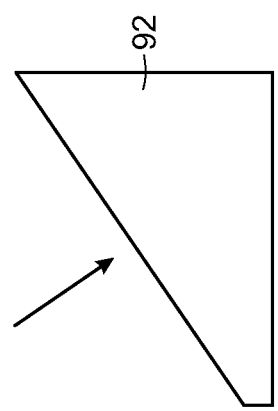

FIGS. 13A and 13B show that for each object 90, 92, the grasp selection system may determine a direction that is normal to the selected flat portion of the object 90, 92. As shown in FIGS. 14A and 14B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical picks), and that such grasp points may be chosen using fiducial features as grasp points, such as picking on a barcode, given that barcodes are almost always applied to a flat spot on the object.

Figure 15:
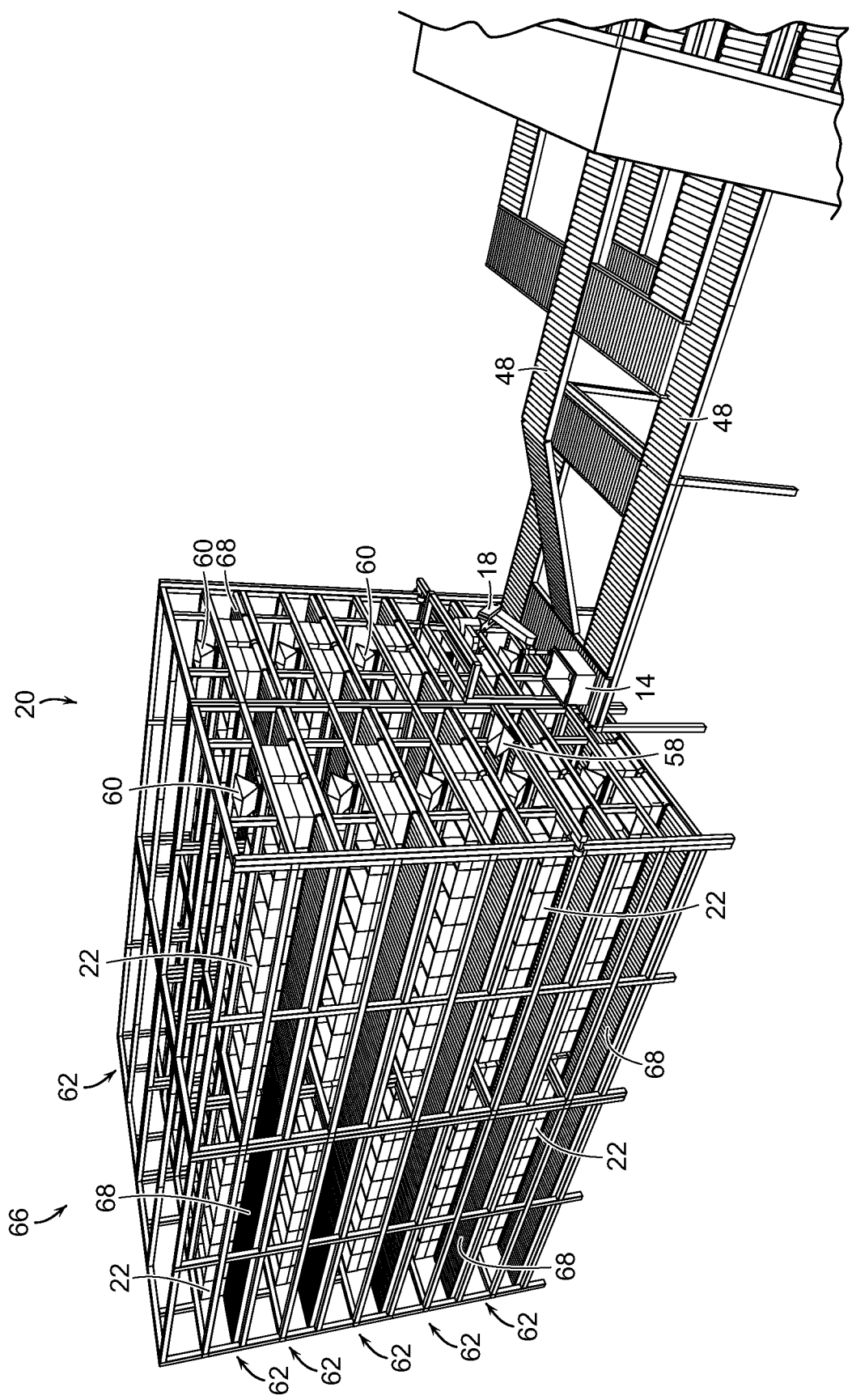
FIG. 15 shows an illustrative diagrammatic view of a destination bin processing station in a system in accordance with an embodiment of the invention.
Figure 16:
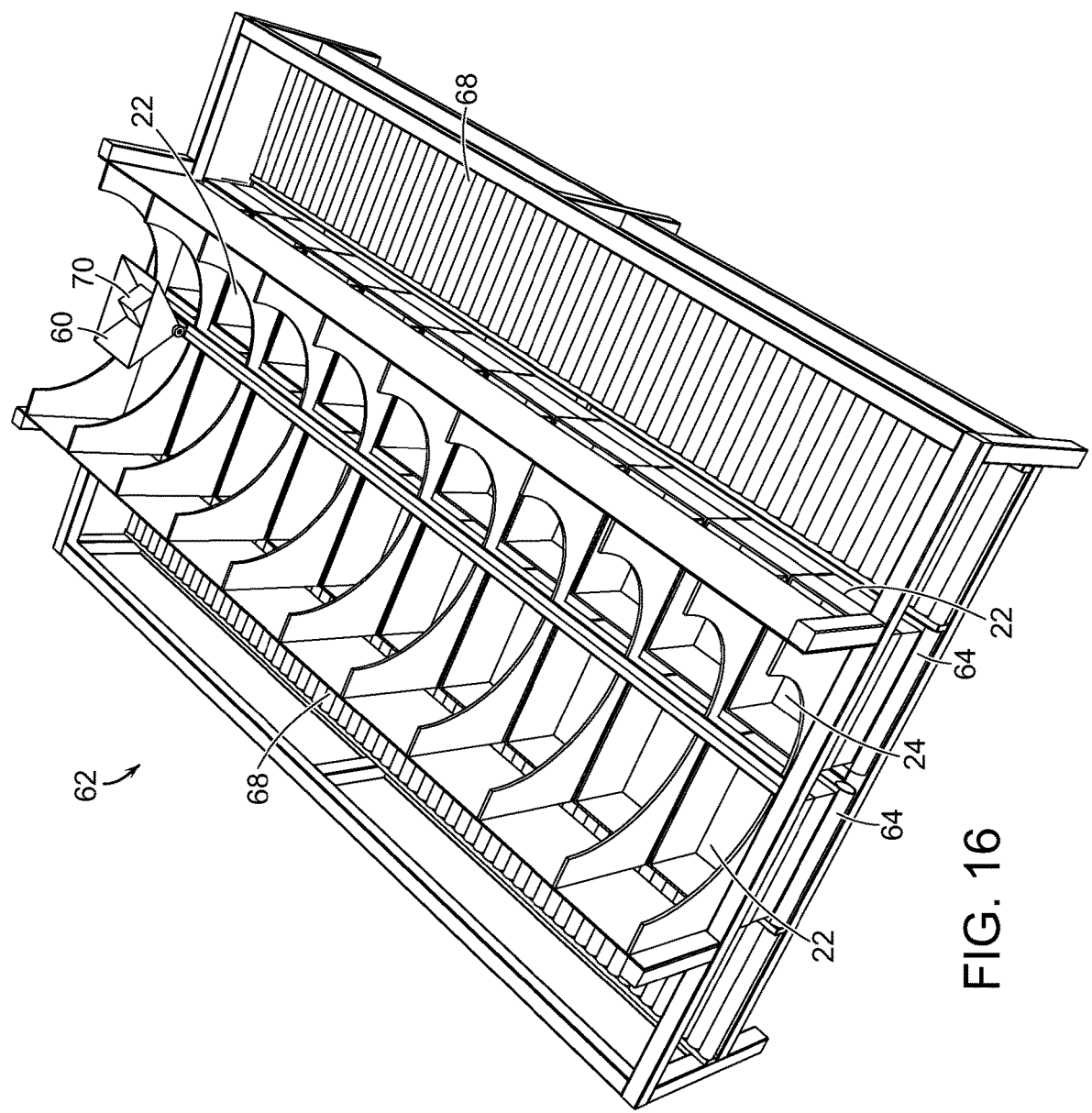
FIG. 16 shows an illustrative diagrammatic view of a processing section in a storage, retrieval and processing system in accordance with an embodiment of the invention wherein an object is placed in a carriage.

With reference again to FIG. 10, the primary carriage 58 moves (in vertical and horizontal directions such as X, Y) a selected object (received from the end effector 56 of the programmable motion device 18) toward one of the shuttle carriages, where the object is then dropped into the selected shuttle carriage 60. FIG. 15 further shows that each of the plurality of shuttle carriages 60 is part of shuttle section 62 that also includes a plurality of destination bins on conveyors 64 (that may be gravity fed biased toward an output end 66 of the destination system 20). As further shown in FIG. 16, each shuttle section 62 also includes an output conveyor 68 onto which completed destination bins may be moved for output to a further processing section or transport at the output end 66 of the destination system 20.

Figure 17:
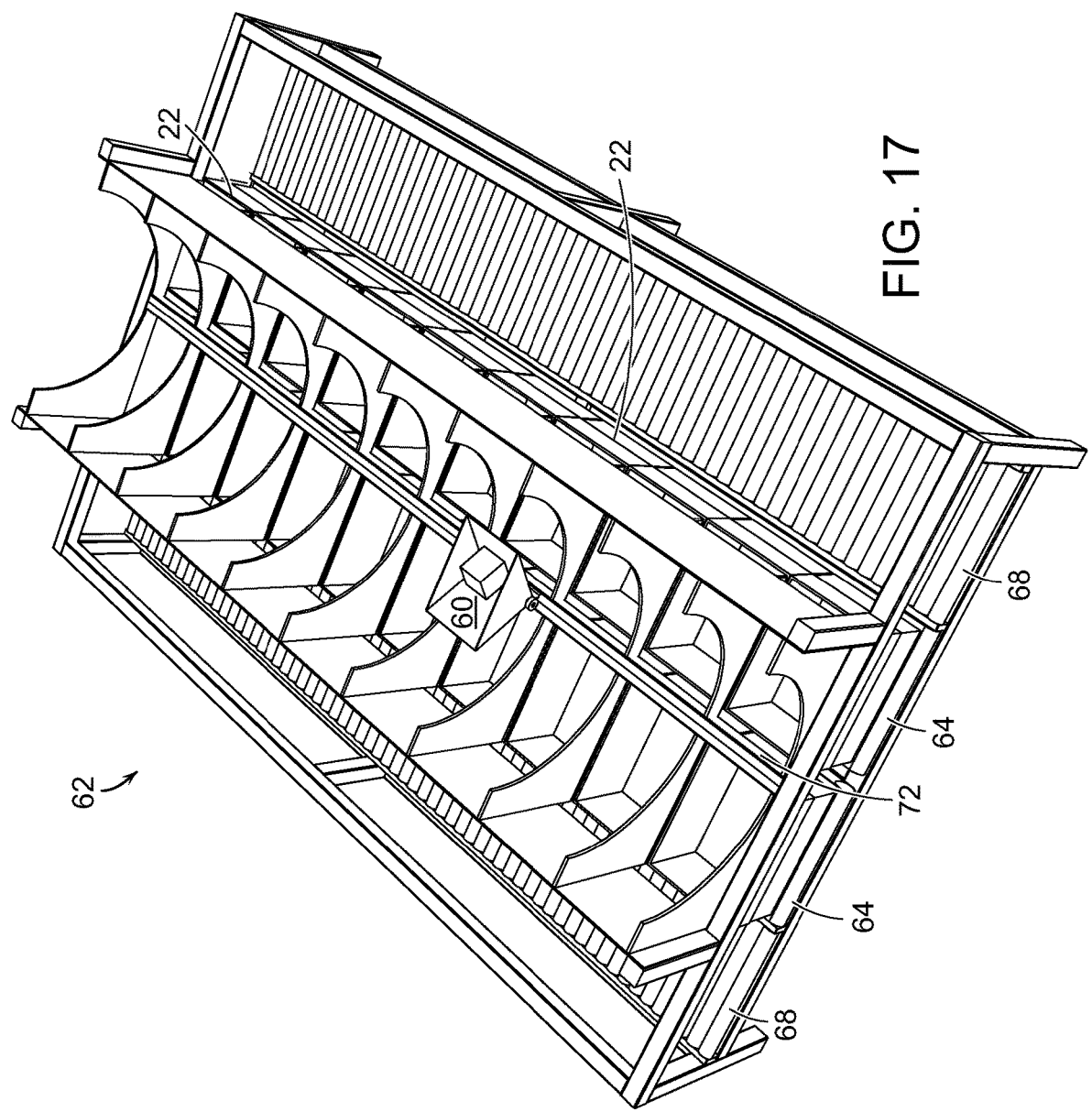
FIG. 17 shows an illustrative diagrammatic view of the processing section of FIG. 16 with the carriage having been moved along its track.
Figure 18:
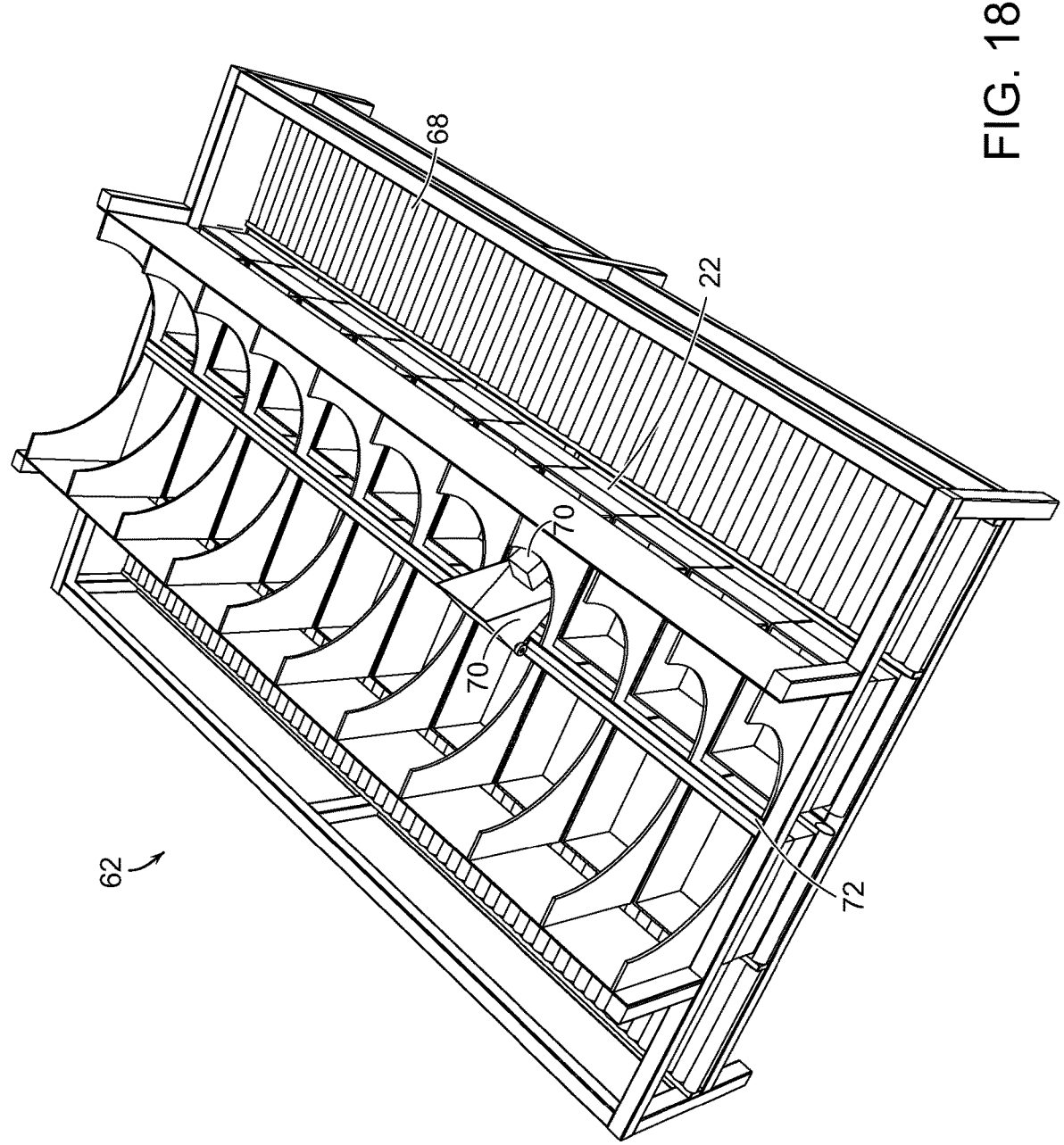
FIG. 18 shows an illustrative diagrammatic view of the processing section of FIG. 16 with the carriage having transferred its load to a destination bin.

Each of the shuttle carriages 60 moves between two rows of destination bins 22 along a track 72 as further shown in FIG. 17. Each carriage 60 may also be actuated to drop an object 70 into a desired destination bin 22 (as shown in FIG. 18). The destination bins 22 may be provided in conveyors 64 (e.g., rollers or belt), and may be biased (for example by gravity) to urge all destination bins toward one end (for example, the end 66 as shown. When a destination bin 22 is selected for removal (e.g., because the bin is full or otherwise ready for further processing), the system will urge the completed bin onto an output conveyor 68 to be brought to a further processing or shipment station. The conveyor 68 may also be biased (e.g., by gravity) to cause any bin on the conveyor to be brought to the output end 66.

Figure 19A:
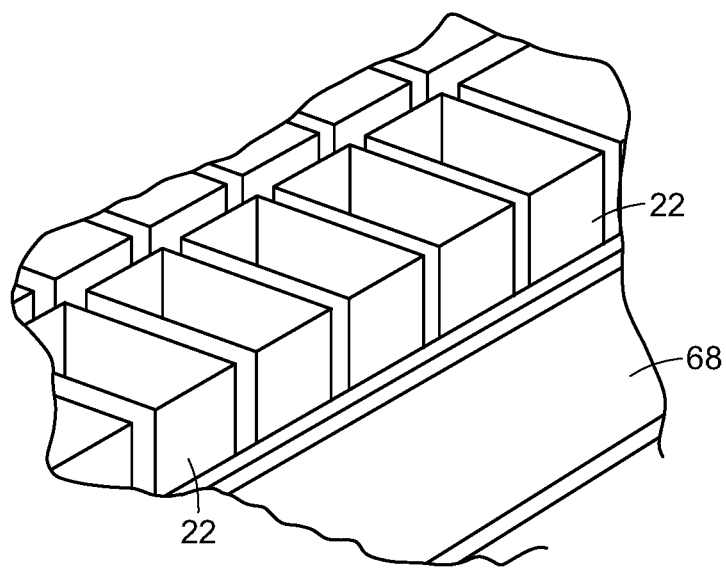
FIGS. 19A and 19B show illustrative diagrammatic views of a bin removal mechanism for use in a storage, retrieval and processing system in accordance with an embodiment of the invention.
Figure 19B:
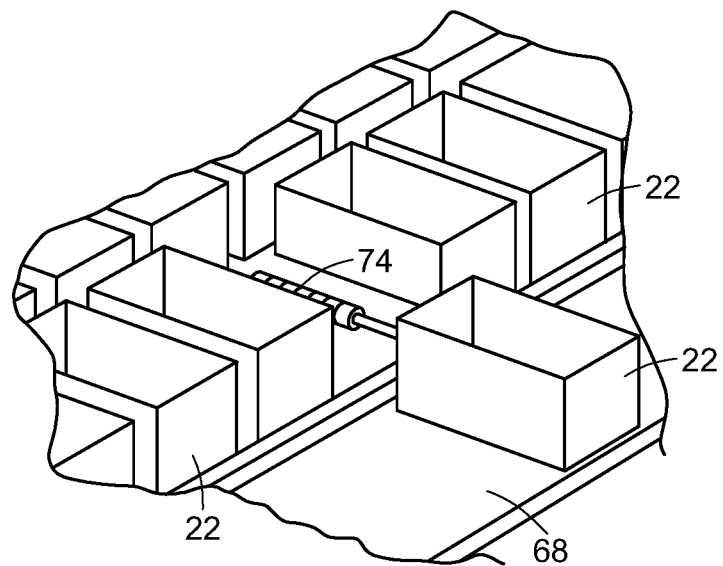
Figure 20:
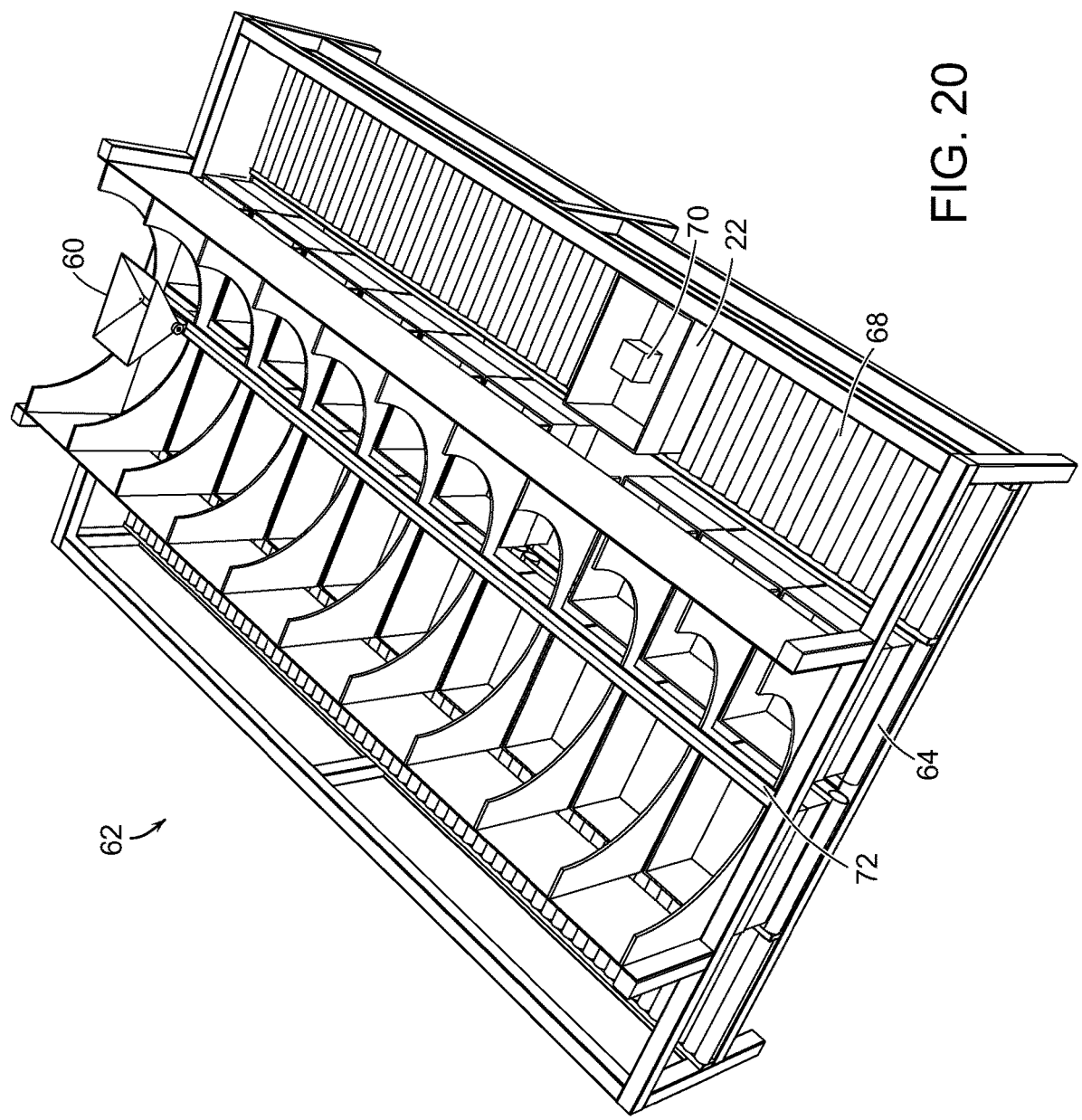
FIG. 20 shows an illustrative diagrammatic view of the processing section of FIG. 16 with the carriage having returned to its base, and a removed destination bin being moved urged from its location.
Figure 21:
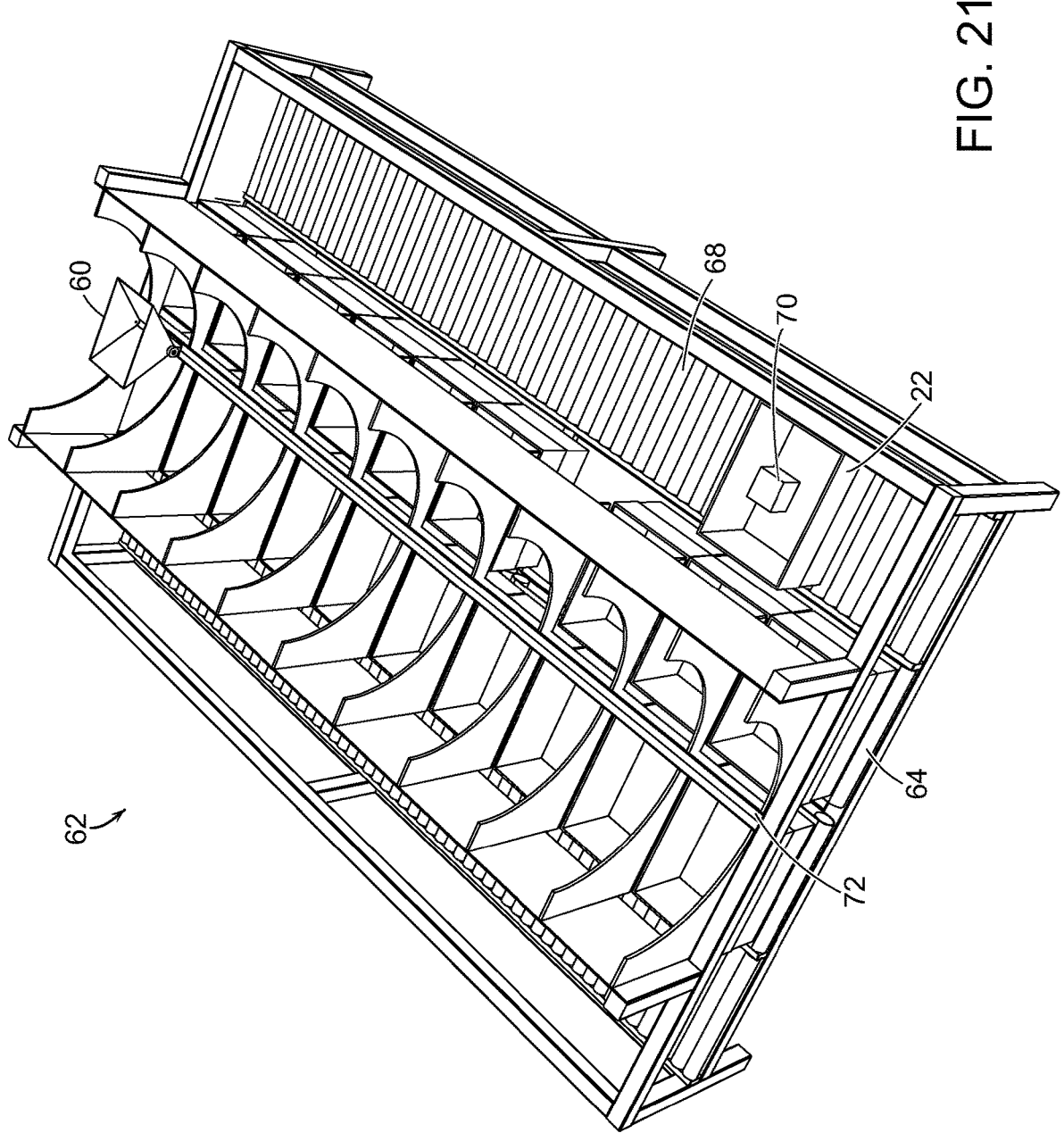
FIG. 21 shows an illustrative diagrammatic view of the processing section of FIG. 16 with the removed destination bin being moved along an output conveyor.

FIGS. 19A and 19B show a bin being urged from a row of the plurality of destination bins, onto the output conveyor 68 by the use of a displacement mechanism 74 that is able to move along the row of bins such that when a bin is selected, the displacement mechanism 74 engages and pushes a bin onto the output conveyor 68. In certain embodiments, each of the locations at which a destination bin will be positioned may include its own displacement mechanism. Following displacement of the bin 22 onto the conveyor 68, each of the destination bins may be urged together, and the system will record the change in position of any of the bins that moved. This way, a new empty bin may be added to the end, and the system will record the correct location and identified processing particulars of each of the destination bins. This is shown in FIGS. 20 and 18, whereby a bin 22 is removed and pushed onto the conveyor 68, and then the remaining bins are urged together while the removed bin rolls toward an output location (see FIG. 21).

Figure 22:
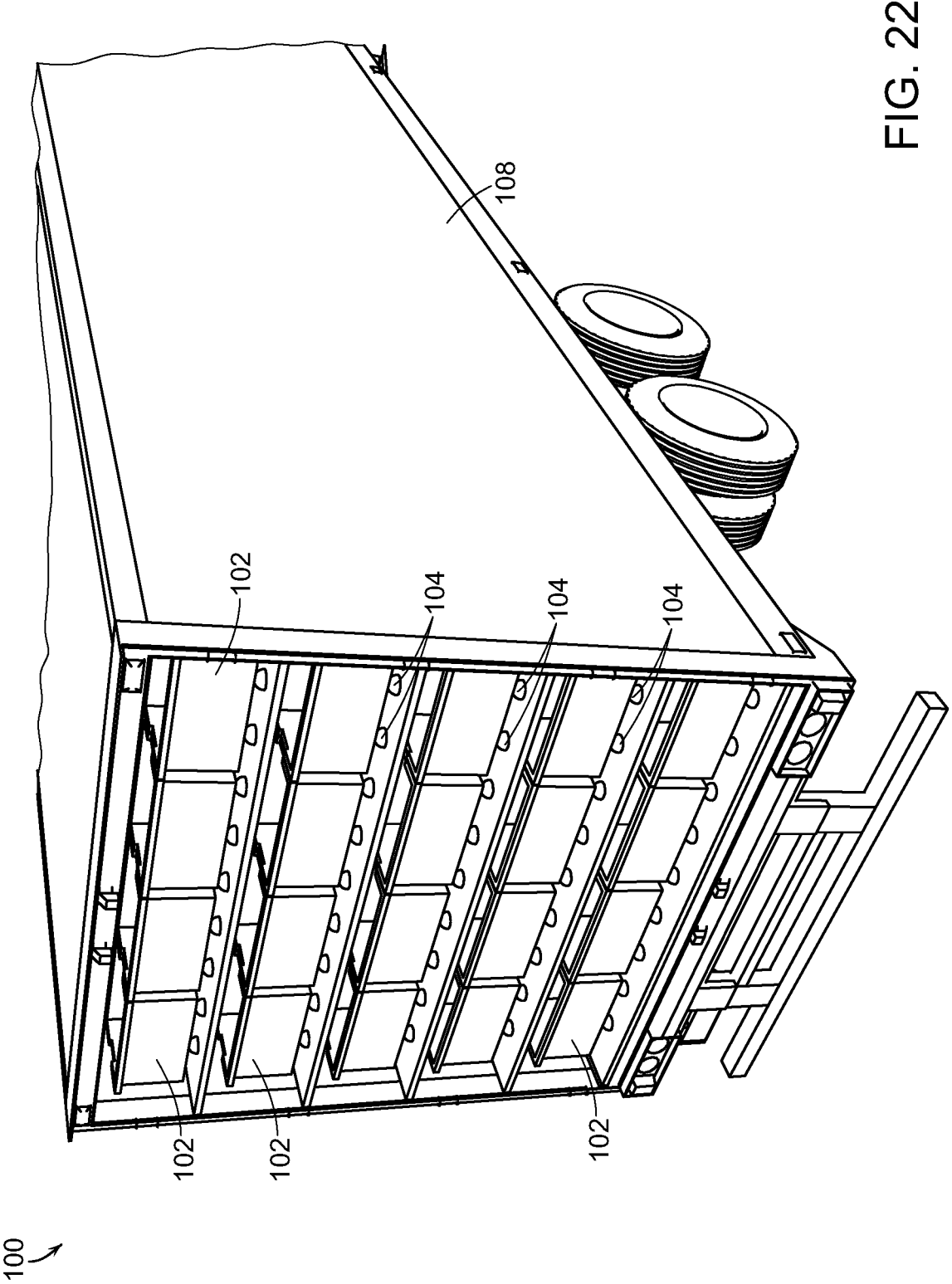
FIG. 22 shows an illustrative diagrammatic view of a vehicle containing storage bins to be transferred to a storage bin system in accordance with an embodiment of the invention.
Figure 23:
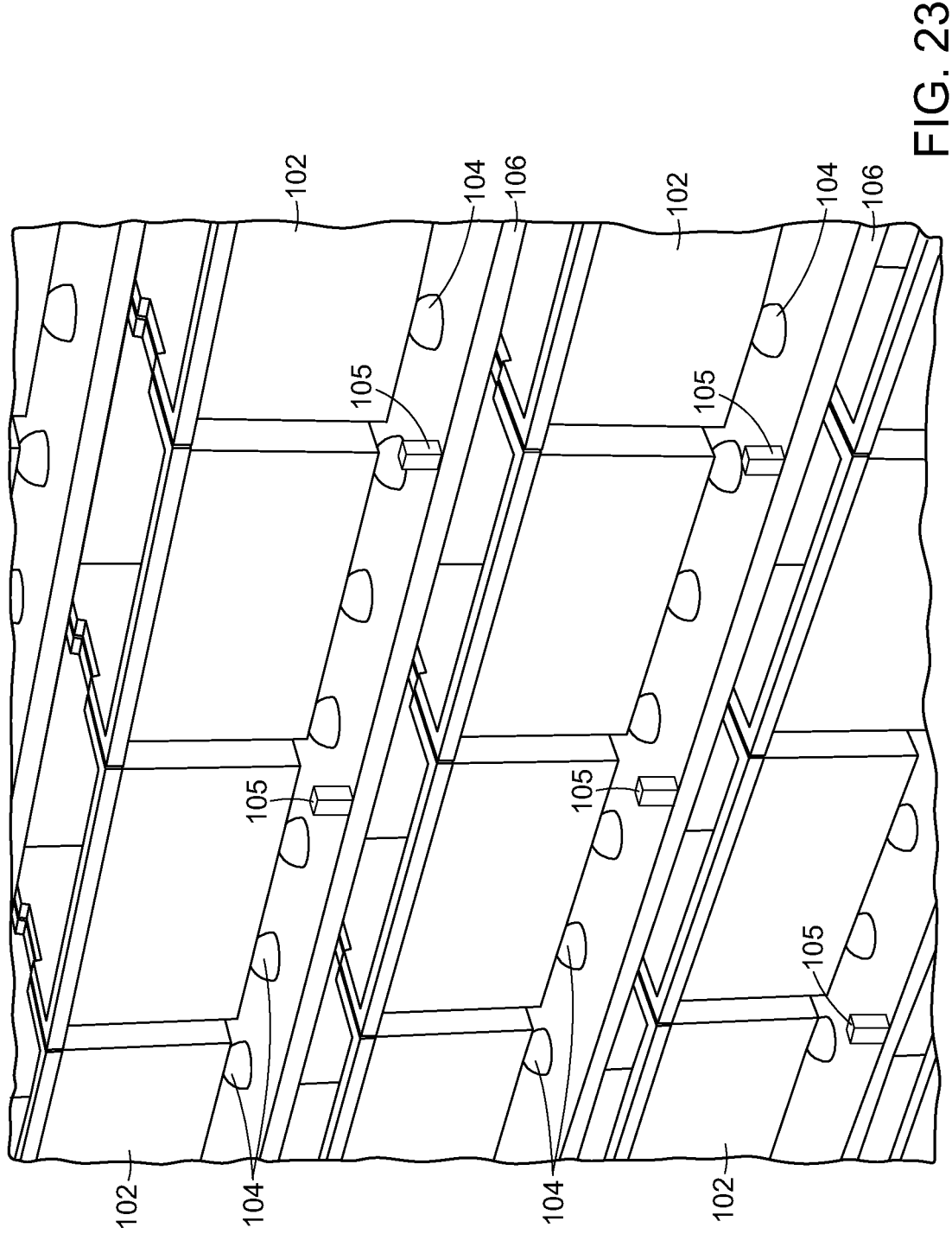
FIG. 23 shows an illustrative diagrammatic enlarged view of a portion of the system of FIG. 22.

As noted above, each of the storage system 12 and destination 20 may interface directly, or via an adapter conveyor system, with vehicles such as tractor trailer vehicles. FIG. 22, for example, shows (with the rear doors removed for clarity) a trailer conveyance system 100 that includes stacked rows of bins 102. The bins 102 are the same as the bins 14 and 22, each may be used for all purposes in the overall system. The bins 102 are provided on roller bearing conveyors 104 (as more clearly shown in FIG. 23) that are provided on shelves 106 within the trailer 108. The shelves 106 may either be built into the trailer floor and inside walls, or may be provided as part of a structure that may be slid into a trailer and then fastened to the floor and/or inside walls of the trailer. The trailer may also provide a mechanism for pushing or pulling each of the rows of bins 102 out of the trailer.

As discussed above, each of the shelves 106 may include perception units 105 that perceive identifying indicia on the outside of each of the bins 102 that uniquely identifies each bin, and by sequence of detections, knows the location of each bin within the trailer 108. Each trailer therefore has stored data regarding not only the contents of the trailer, but also the order of the contents in the bins. Not only may this facilitate the efficient processing of objects and bins at automated storage, retrieval and processing systems in accordance with various embodiment of the present invention, but this provides valuable information regarding which tractor trailers should be routed to which processing centers and when they may be most needed. Such a system also provides that objects within a trailer are not randomly placed in a trailer, and do not need to be individually handled by a human worker to be unloaded from the trailer. The unloading, in fact, may be accomplished very quickly while also knowing the identities of all bins and all contents of the bins, saving an enormous amount of resources.

Figure 24:
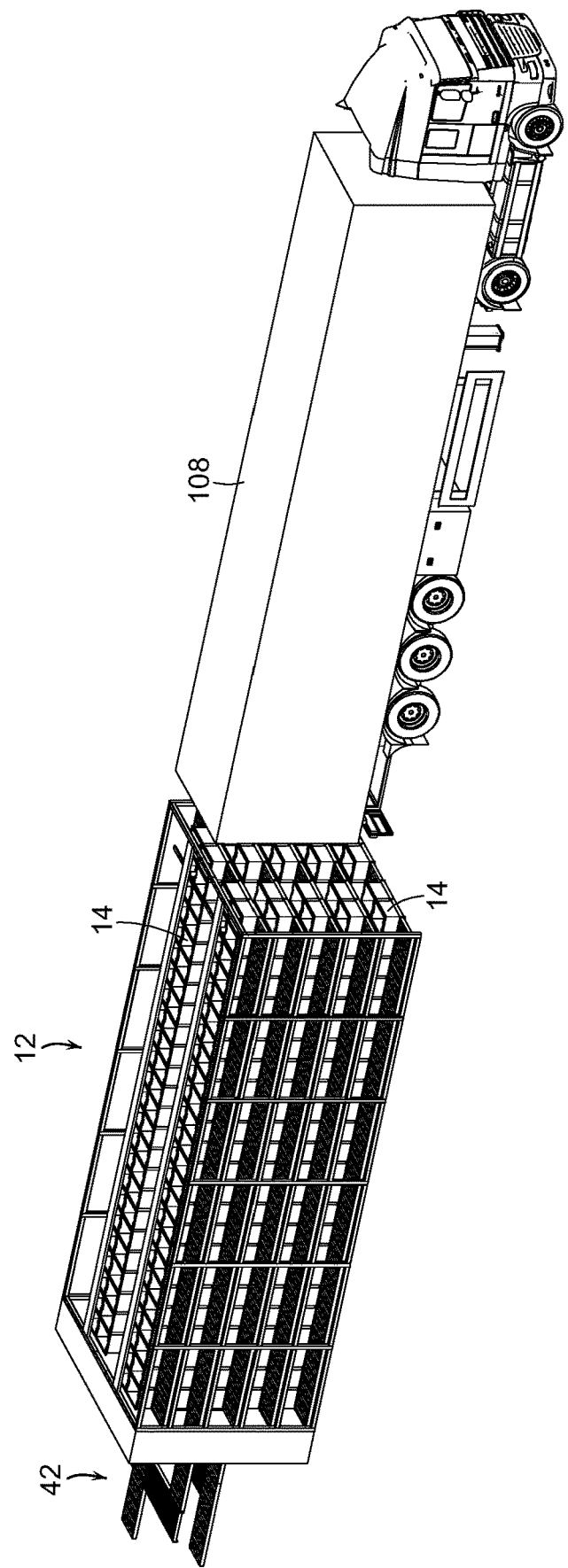
FIG. 24 shows an illustrative diagrammatic view of a vehicle loading storage bins into a storage bin system in accordance with an embodiment of the present invention.
Figure 25:
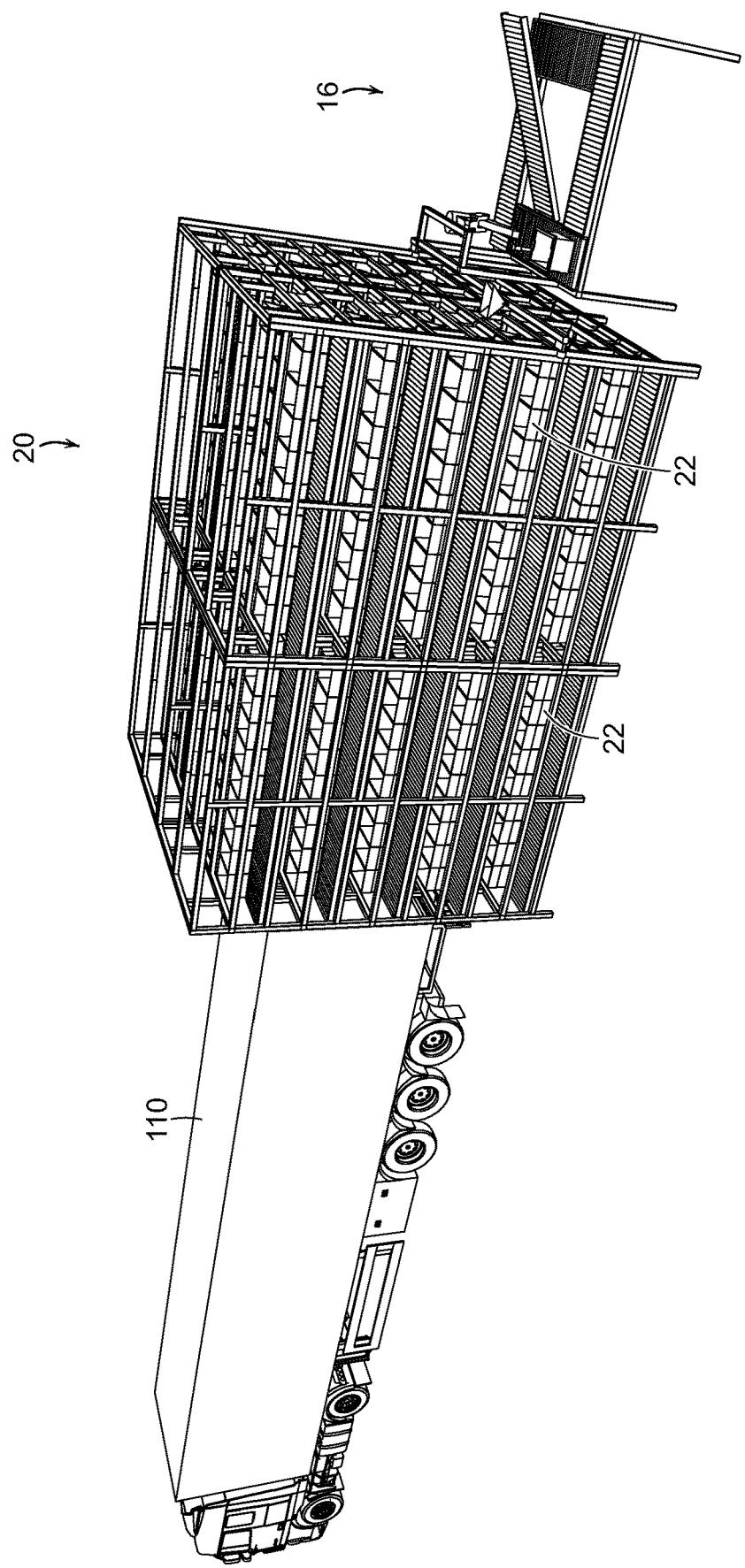
FIG. 25 shows an illustrative diagrammatic view of a vehicle loading destination bins from a destination bin system in accordance with an embodiment of the present invention.

FIG. 24 diagrammatically shows a trailer 108 backed up to a storage system 12, and FIG. 25 diagrammatically shows a trailer 110 backed up to a destination system 20. As mentioned above, each of these interfaces may include an adaptor conveyor system 120 as shown in FIGS. 26A and 26B. The adaptor conveyor system 120 may include a plurality of conveyors that change the vertical and horizontal distances between different conveyors. Through use of such an adaptor system 120, bins of conveyors may be closely spaced in a tractor trailer, yet provide enough work room around the conveyors in each of the storage system and the destination system. For example, FIG. 26A shows a top view of such an adaptor system 120 that may be used between a trailer 122 (e.g., a trailer 108 or 110) and a system 124 (e.g., a storage system 12 or a destination system 20). The adaptor system 120 includes conveyors 126 that adjust the vertical and horizontal spacing between conveyors so that the conveyor positions of the joining systems will readily connect with one another.

Figure 27:
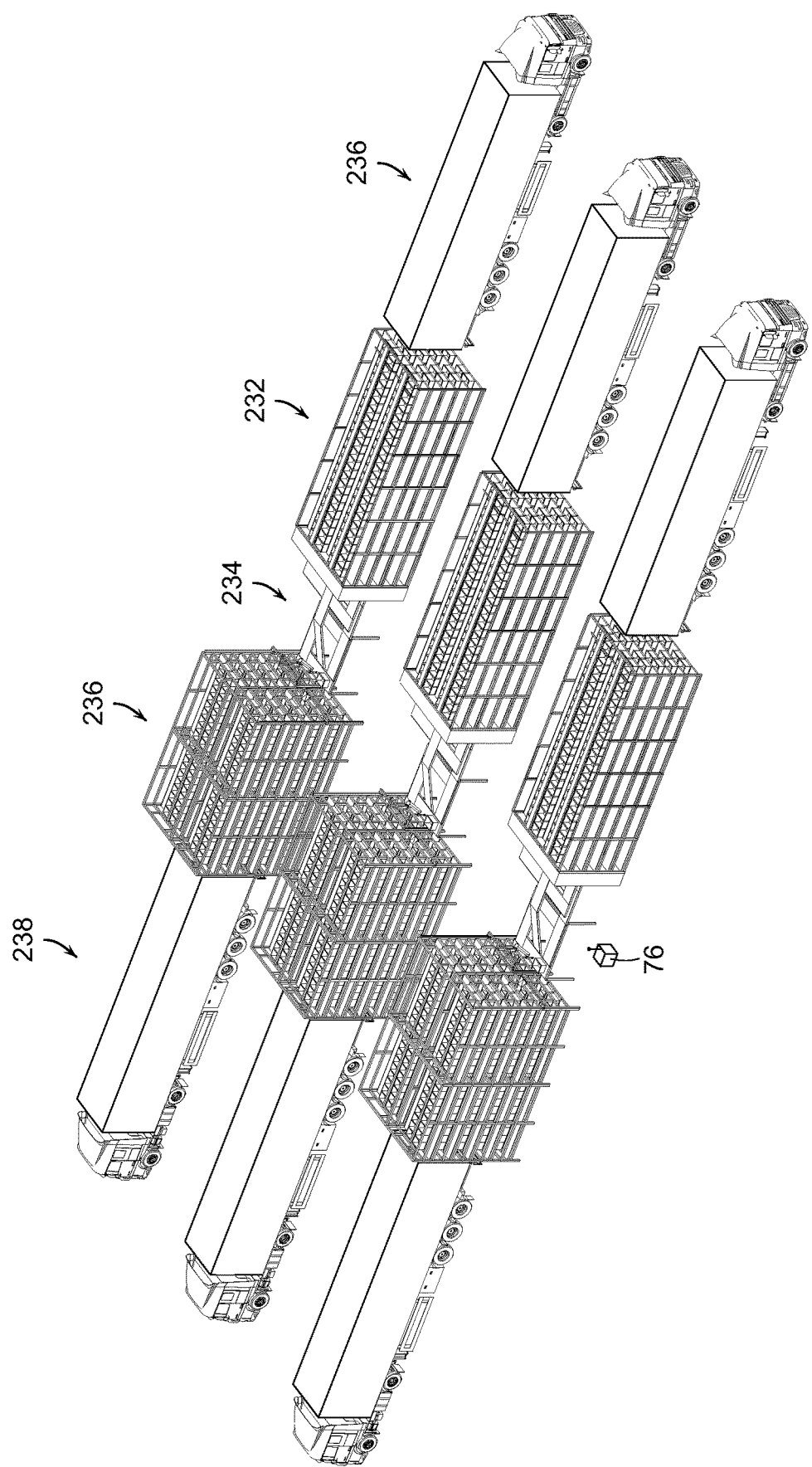
FIG. 27 shows an illustrative diagrammatic view of a plurality of vehicles providing storage bins to, and a plurality of destination bins receiving destination bins from, a system in accordance with a further embodiment of the invention.

FIG. 27 shows an overall system (without any adaptor conveyor systems for clarity) in which trailers 230 engage sortation systems 232 (e.g., plural sortation system 12), that are in communication with processing systems 234 (e.g., plural processing systems 16). The processing systems 20 are in communication with distribution systems 236 (e.g., plural distribution systems 20), that may engage a plurality of trailers 238. Systems of the invention are highly scalable in terms of sorts-per-hour as well as the number of storage bins and destination bins that may be available by adding additional systems and tractor trailer dock bays. Systems of the invention also significantly reduce trailer loading and unloading times, as well as reduce human power assistance in such processes. Further, the systems are easily extensible for throughput (destinations) by adding more linear processing components, as well as stock SKUs by adding more tote storage components.

Systems of various embodiments therefore provide that trailers of tractor trailers may become integrated components of automated storage, retrieval and processing systems. Empty bins may initially be provided to the destination system (either in reverse direction from the output end 66, or in further embodiments, by providing a mechanism, such as the end effector of the robot 18, by which empty bins may be provided from the sortation system to the destination system). As sortation bins at the sortation system are emptied, the bins are provided to the destination system. New bins of objects may be provided to the sortation system by supplier trailers 108, 130 as discussed above, and output destination bins may be queued up and prepared for delivery to a transportation trailer 110, 138.

Control of each of the overall system (including interfacing with the vehicles and controlling movement of the bins in the vehicles), may be provided by the computer system 76 that is in communication with each of the conveyors and displacement mechanisms, carriages, and the programmable motion devices. The computer system 76 also contains the knowledge (continuously updated) of the location and identity of each of the storage bins, and contains the knowledge (also continuously updated) of the location and identity of each of the destination bins. In accordance with certain embodiments, each trailer may also include sensors that identify each bin as it is loaded into the trailer (similar to the perception units 34 in the storage system), so that each vehicle may have recorded information regarding the contents and order of all bins in the vehicle.

When the trailer comes within a local area network of the system 10, the stored information regarding the contents and order of the bins 102 may be immediately provided to the computer system 76. The system therefore, directs the movement of the vehicle bins, the storage bins and the destination bins, and retrieves objects from the storage bins, and distributes the objects to the destination bins in accordance with an overall manifest that dictates which objects must be provided in which destination boxes for shipment, for example, to distribution or retail locations. Once a full shipment of destination bins 22 are provided on output conveyors 68, a trailer with an empty trailer conveyance system may back up to the destination system and (again, optionally via an adaptor conveyor system) be very quickly loaded with the destination bins (that are also provided in a known order). The shipment destination may also take advantage of the fact that the contents and order of the bins are fully known prior to shipment.

Those skilled in the art will appreciate that numerous modifications and variations may be made to the above disclosed embodiments without departing from the spirit and scope of the present invention.

What is claimed is:

1. A processing system for processing objects, said processing system comprising:
    a first trailer receiving area for receiving a first trailer of a first tractor trailer;
    a storage container system for receiving a plurality of objects from the first trailer at the first trailer receiving area in a plurality of storage containers that provide storage of the plurality of objects, said plurality of storage containers being provided in a plurality of storage container vertical levels, each storage container vertical level including a plurality of rows of storage containers, each row of storage containers extending from a first end of the storage container system to a second end of the storage container system;
    a processing section proximate the storage container system and a destination container system for presenting a selected storage container from the storage container system to a programmable motion device;
    the destination container system for receiving the plurality of objects from the processing section for delivery to any of a plurality of destination containers, said plurality of destination containers being provided in a plurality of destination container vertical levels, each destination container vertical level including a plurality of rows of destination containers, each row of destination containers extending from a first end of the destination container system to a second end of the destination container system; and
    a second trailer receiving area for receiving the plurality of destination containers from the destination container system and for providing the plurality of destination containers to a second trailer of a second tractor trailer.

2. The processing system as claimed in claim 1, wherein the storage container system further includes a storage container removal system for removing the selected storage container from its associated row of storage containers.

3. The processing system as claimed in claim 2, wherein the storage container removal system includes at least one box kicker assembly for urging the selected storage container of the plurality of storage containers onto a removal conveyor.

4. The processing system as claimed in claim 2, wherein the storage container system further includes a storage container return system for returning the selected storage container to the storage container system.

5. The processing system as claimed in claim 1, wherein the destination container system includes a plurality of reciprocating carriages, each of which is in communication with at least one row of destination containers.

6. The processing system as claimed in claim 5, wherein at least a subset of the plurality of the reciprocating carriages are in communication with two rows of the destination containers, and each such reciprocating carriage is adapted to tip in either of two mutually opposing directions that are transverse to a direction of travel of the respective reciprocating carriage.

7. The processing system as claimed in claim 5, wherein the destination container system further includes a vertically and horizontally movable carriage that is in communication with first ends of each of the rows of destination containers.

8. The processing system as claimed in claim 7, wherein the vertically and horizontally movable carriage is adapted to drop any of the contents of the vertically and horizontally movable carriage into a selected reciprocating carriage.

9. The processing system as claimed in claim 2, wherein the first trailer receiving area includes a storage adaptor conveyor system for moving the plurality of objects from the first trailer to the storage container system.

10. The processing system as claimed in claim 2, wherein the second trailer receiving area includes a destination container adaptor conveyor system for moving the plurality of objects from the plurality of destination container vertical levels to the second trailer.

11. A processing system for processing objects, said processing system comprising:
a first trailer receiving area for receiving a first trailer of a first tractor trailer;
a storage container system for receiving a plurality of objects from the first trailer at the first trailer receiving area in a plurality of storage containers that provide storage of the plurality of objects, said plurality of storage containers being provided in a plurality of storage container vertical levels, each storage container vertical level including a plurality of rows of storage containers, each row of storage containers extending from a first end of the storage container system to a second end of the storage container system;
a processing section proximate the storage container system and a destination container system for presenting a selected storage container from the storage container system to an object conveyance system, the object conveyance system for delivering an object from the selected storage container to a destination container of any of a plurality of destination containers provided in a plurality of destination container vertical levels, each of which includes a plurality of rows of destination containers;
the destination container system for receiving the plurality of objects from the processing section for delivery to any of the plurality of destination containers, said plurality of destination containers being provided in the plurality of destination container vertical levels, each destination container vertical level including the plurality of rows of destination containers, each row of destination containers extending from a first end of the destination container system to a second end of the destination container system; and
a second trailer receiving area for receiving the plurality of destination containers from the destination container system and for providing the plurality of destination containers to a second trailer of a second tractor trailer.

12. The processing system as claimed in claim 11, wherein the storage container system further includes a storage container removal system for removing the selected storage container from its associated row of storage containers.

13. The processing system as claimed in claim 12, wherein the storage container removal system includes at least one box kicker assembly for urging the selected storage container of the plurality of storage containers onto a removal conveyor.

14. The processing system as claimed in claim 12, wherein the storage container system further includes a storage container return system for returning the selected storage container to the storage container system.

15. The processing system as claimed in claim 11, wherein the destination container system includes a plurality of reciprocating carriages, each of which is in communication with at least one row of the plurality of rows of destination containers.

16. The processing system as claimed in claim 15, wherein at least a subset of the plurality of the reciprocating carriages are in communication with two rows of the destination containers, and each such reciprocating carriage is adapted to tip in either of two mutually opposing directions that are transverse to a direction of travel of the respective reciprocating carriage.

17. The processing system as claimed in claim 15, wherein the destination container system further includes a vertically and horizontally movable carriage that is in communication with first ends of each of the rows of destination containers.

18. The processing system as claimed in claim 17, wherein the vertically and horizontally movable carriage is adapted to drop any of the contents of the vertically and horizontally movable carriage into a selected reciprocating carriage.

19. The processing system as claimed in claim 12, wherein the first trailer receiving area includes a storage adaptor conveyor system for moving the plurality of objects from the first trailer to the storage container system.

20. The processing system as claimed in claim 12, wherein the second trailer receiving area includes a destination container adaptor conveyor system for moving the plurality of objects from the plurality of destination container vertical levels to the second trailer.

21. A method of processing objects comprising:
receiving in a first trailer receiving area a first trailer of a first tractor trailer;
receiving from the first trailer a plurality of objects in a storage container system, the storage container system including a plurality of storage containers providing storage of the plurality of objects, said plurality of storage containers being provided in a plurality of storage container vertical levels, each storage container vertical level including a plurality of rows of storage containers;
receiving in a destination container system, the plurality of objects for delivery to any of a plurality of destination containers, said plurality of destination containers being provided in a plurality of destination container vertical levels, each destination container vertical level including a plurality of rows of destination containers;

moving objects from a selected storage container from the storage container system to a processing station at which selected objects are removed to one or more selected destination containers of the destination container system;

moving the selected objects to any of the plurality of destination containers provided in the plurality of destination container vertical levels, each of which includes the plurality of rows of destination containers; and receiving the plurality of destination containers at a second trailer of a second tractor trailer at a second trailer receiving area.

22. The method of claim 21, wherein the method further includes removing a selected storage container from its associated row of storage containers, and delivering the selected storage container to a programmable motion device.

23. The method of claim 22, wherein the method further includes returning the selected storage container to the storage container system.

24. The method of claim 21, wherein the destination container system includes a plurality of reciprocating carriages, each of which is in communication with at least one row of destination containers.

25. The method of claim 24, wherein at least a subset of the plurality of the reciprocating carriages are in communication with two rows of the destination containers, and each such reciprocating carriage is adapted to tip in either of two mutually opposing directions that are transverse to a direction of travel of the respective reciprocating carriage.

26. The method of claim 21, wherein the destination container system further includes a vertically and horizontally movable carriage that is in communication with each of the rows of destination containers.

27. The method of claim 26, wherein the vertically and horizontally movable carriage is adapted to drop any of the contents of the vertically and horizontally movable carriage into a selected reciprocating carriage.

28. The method of claim 21, wherein the first trailer receiving area includes a storage adaptor conveyor system for moving the plurality of objects from the first trailer to the storage container system.

29. The method of claim 21, wherein the second trailer receiving area includes a destination container adaptor conveyor system for moving the plurality of objects from the plurality of destination container vertical levels to the second trailer.

* * * * *